United States Patent [19]
Agulnick et al.

[11] Patent Number: 5,347,295
[45] Date of Patent: Sep. 13, 1994

[54] CONTROL OF A COMPUTER THROUGH A POSITION-SENSED STYLUS

[75] Inventors: Todd Agulnick, Newton Centre, Mass.; Robert Carr, San Francisco, Calif.; Tony Hoeber, Woodside, Calif.; S. Jerrold Kaplan, San Francisco, Calif.; David R. Low, Oakland, Calif.; Michael Ouye, Palo Alto, Calif.

[73] Assignee: GO Corporation, Foster City, Calif.

[21] Appl. No.: 610,231

[22] Filed: Oct. 31, 1990

[51] Int. Cl.⁵ ............................................. G09G 5/00
[52] U.S. Cl. ..................................... 345/156; 345/179
[58] Field of Search ................. 382/13, 14, 57, 59, 382/40; 178/18, 19; 340/706, 707, 709; 345/156, 179

[56] References Cited

U.S. PATENT DOCUMENTS

| | | | |
|---|---|---|---|
| 3,699,439 | 10/1972 | Turner | 324/71.1 |
| 3,832,693 | 8/1974 | Ishizaki et al. | 364/900 |
| 4,016,542 | 4/1977 | Azure | 364/900 |
| 4,055,726 | 10/1977 | Turner et al. | 178/18 |
| 4,071,691 | 1/1978 | Pepper, Jr. | 178/19 |
| 4,112,415 | 9/1978 | Hilbrink | 382/13 |
| 4,129,747 | 12/1978 | Pepper, Jr. | 178/18 |
| 4,177,354 | 12/1979 | Mathews | 178/19 |
| 4,184,147 | 1/1980 | Seelbach | 382/13 |
| 4,198,539 | 4/1980 | Pepper, Jr. | 178/18 |
| 4,262,281 | 4/1981 | Buckle et al. | 382/13 |
| 4,293,734 | 10/1981 | Pepper, Jr. | 178/18 |
| 4,302,011 | 11/1981 | Pepper, Jr. | 178/19 |
| 4,318,096 | 3/1982 | Thornburg et al. | 360/706 |
| 4,353,552 | 10/1982 | Pepper, Jr. | 382/13 |
| 4,365,235 | 12/1982 | Greanias et al. | 382/13 |
| 4,371,746 | 2/1983 | Pepper, Jr. | 178/18 |
| 4,456,787 | 6/1984 | Schlosser et al. | 178/19 |
| 4,475,239 | 10/1984 | van Raamsdonk | 382/52 |
| 4,520,357 | 5/1985 | Castleberry et al. | 340/703 |
| 4,641,354 | 2/1987 | Fukunaga et al. | 382/13 |
| 4,672,677 | 6/1987 | Yamakawa | 382/13 |
| 4,679,241 | 7/1987 | Lukis | 382/13 |
| 4,680,430 | 7/1987 | Yoshikawa et al. | 178/19 |
| 4,680,804 | 7/1987 | Kuzunuki et al. | 382/13 |
| 4,764,885 | 8/1988 | Greanias et al. | 364/571 |
| 4,786,765 | 11/1988 | Yamanami et al. | 178/19 |
| 4,831,556 | 5/1989 | Oono | 364/521 |
| 4,839,634 | 6/1989 | More et al. | |
| 4,972,496 | 11/1990 | Sklarew | 382/13 |
| 5,050,105 | 9/1991 | Peters | 340/734 |
| 5,053,758 | 10/1991 | Cornett et al. | 340/712 |
| 5,151,950 | 9/1992 | Hullender | |

FOREIGN PATENT DOCUMENTS

| | | | |
|---|---|---|---|
| 0203324 | 3/1986 | European Pat. Off. | |
| 0242598 | 10/1987 | European Pat. Off. | |
| 0254561 | 1/1988 | European Pat. Off. | |
| 2117154 | 10/1983 | United Kingdom | |
| 2193023 | 1/1988 | United Kingdom | 382/13 |

OTHER PUBLICATIONS

IBM Technical Disclosure Bulletin, "Object-Picking Method by Hierarchical Hand-Marking," vol. 30, No. 9, pp. 348-350, Feb. 1988 (New York).
GRiD Systems Corporation, "GRiDPAD Computer Owner's Guide" (1989-1990, California).
Wacom Co., Ltd., "User Manual for SD-510 A5 Type Digitizer" (Jul. 1988; place of publication unknown).
Linus Technologies, Inc., LINUS Write-Top User's Guide (1987 Virginia).
PC Magazine, "Digitizing Tablets/Pointing the Way to Easier Input" by Winn L. Rosch (1989 U.S.A.).

*Primary Examiner*—Jeffery Brier
*Attorney, Agent, or Firm*—Matthew C. Rainey; Amir H. Raubvogel

[57] ABSTRACT

A notebook computer which is controlled by a stylus executing gestures on the computer screen. The stylus and the computer include complementary electronic circuitry by which the proximity of the stylus tip to the computer is sensed. The proximity sensing is used to detect to approach of the stylus tip to the computer screen, and gestural commands are then entered on the screen by moving the stylus. The entry of a command is terminated by removing the stylus tip from proximity with the screen, which is detected by the computer, which then implements the command. Alternative methods of implementing the commands include time-outs and command termination buttons.

46 Claims, 73 Drawing Sheets

| Sample Notebook: Contents | ← 1 → |

Document  Edit  Create  View  Show  Sort

| Name | | Page |
|---|---|---|
| ▯ First Experience | | ▷ 2 |
| ▯ Samples | | ▷ 3 |
|    ▯ New Uses for Eggplant | | ▷ 4 |
|    ▯ Bottle Design Needed | | ▷ 5 |
| ▯ Application | | ▷ 6 |
| ▯ Reports | | ▷ 7 |
|    ▯ August 2nd | | ▷ 8 |

310 → Samples
320 → Reports
350 → View
360 → New Uses for Eggplant / Bottle Design Needed
370 → August 2nd

[proximity]

Tabs: Contents | First Experience | Samples

Fig. 6

Sample Notebook: Contents  ← 1 →

Document  Edit  Create  View  Show  Sort

| Name | Page |
|---|---|
| ▯ First Experience | ▷ 2 |
| ▯ Samples | ▷ 3 |
| ▯ Application | ▷ 6 |
| ▯ Reports | ▷ 7 |

390 — 440

Application  6

Document  Edit  Insert  Case  Format

The present invention describes methods and apparatus for a stylus-driven computer. Said computer presents the behavior of a multi-page notebook including visible pages, page-turn effects, tabbed bookmarks along one or more edge, "floating" pages temporarily removed from their notebook location, a table-of-contents, and contents of sub-sections. Each page in the notebook contains one document which may contain many physical pages when printed. These pages are analogous to data files in other computers and may contain different types of documents such as text, drawings, FAX images, or specialized forms. Some information (such as the "Help Information") is contained in separate

380

410   400

Contents | First Experience | Samples

[proximity]

Fig. 7

Application  6

Document  Edit  Insert  Case  Format

The present invention describes methods and apparatus for a stylus-driven computer. Said computer presents the behavior of a multi-page notebook including visible pages, page-turn effects, tabbed bookmarks along one or more edge, "floating" pages temporarily removed from their notebook location, a table-of-contents, and contents of sub-sections. Each page in the notebook contains one document which may contain many physical pages when printed. These pages are analogous to data files in other computers and may contain different types of documents such as text, drawings, FAX images, or specialized forms. Some information (such as the "Help Information") is contained in separate notebooks with all of the features listed above. The primary means of control of the computer is a rich set of gestures with the stylus over almost any object visible on the display. Gestures with a stylus offer a more concise vocabulary than tradition pointing devices because they combine both selection (by their location) and meaning (the specific gesture) in one movement. A common set of gestures can delete, move, copy, or edit diverse objects such as text fragments, buttons, documents, or entire notebooks. Gestures can initiate the insertion of hand-written text, the editing of existing text, page-turning, scrolling within a window, zooming or shrinking of entire pages, selection, summoning of windows containing operator guidance, or the creation of links ("goto" buttons) to other pages.

The proximity of the stylus to the display's front surface is used to anticipate and terminate stylus input events. By sensing both the proximity of the stylus tip to, and contact with, the display surface the user-interface software can more accurately discern the vertical movement of the stylus, provide a richer vocabulary of stylus movements for control of the computer, and offer better feedback to the user.

When using the stylus for selection, movements into proximity can trigger display events which give the user a preview of what display objects are understood to be targeted by the computer. For example the computer can

Fig. 8

Sample Notebook: Contents ← 1 →

Document Edit Create View Show Sort

| Name | Page |
|---|---|
| ☐ First Experience | ▷ 2 |
| ☐ Samples | ▷ 3 |
| ☐ Application | ▷ 6 |
| ☐ Reports | ▷ 7 |

390 — 380 — 440

Application 6

Document Edit Insert Case Format

The present invention describes methods and apparatus for a stylus-driven computer. Said computer presents the behavior of a multi-page notebook including visible pages, page-turn effects, tabbed bookmarks along one or more edge, "floating" pages temporarily removed from their notebook location, a table-of-contents, and contents of sub-sections. Each page in the notebook contains one document which may contain many physical pages when printed. These pages are analogous to data files in other computers and may contain different types of documents such as text, drawings, FAX images, or specialized forms. Some information (such as the "Help Information") is contained in separate

420

400

[proximity] 410

Fig. 9

Sample Notebook: Contents  ← 1 →

Document  Edit  Create  View  Show  Sort

| Name | Page |
|---|---|
| ▢ First Experience | ▷ 2 |
| ▢ Samples | ▷ 3 |
| ▢ Application | ▷ 6 |
| ▢ Reports | ▷ 7 |

— 390      — 440

Application     6

Document  Edit  Insert  Case  Format

The present invention describes methods and apparatus for a stylus-driven computer. Said computer presents the behavior of a multi-page notebook including visible pages, page-turn effects, tabbed bookmarks along one or more edge, "floating" pages temporarily removed from their notebook location, a table-of-contents, and contents of sub-sections. Each page in the notebook

380

410   420   430

Contents | First Experience | Samples

[proximity]

[First Experience]

Fig. 10

Sample Notebook: Contents ← 1 →

Document  Edit  Create  View  Show  Sort

| Name | Page |
|---|---|
| ▢ First Experience | ▷ 2 |
| ▢ Samples | ▷ 3 |
| ▢ Application | ▷ 6 |
| ▢ Reports | ▷ 7 |

— 440     — 380

445 — Application     6

~~Document  Edit  Insert  Case  Format~~

The present invention describes methods and apparatus for a stylus-driven computer. Said computer presents the behavior of a multi-page notebook including visible pages, page-turn effects, tabbed bookmarks along one or more edge, "floating" pages temporarily removed from their notebook location, a table-of-contents, and contents of sub-sections. Each page in the notebook contains one document which may contain many physical pages when printed. These pages are analogous to data files in other computers and may contain different types of documents such as text, drawings, FAX images, or specialized forms. Some information (such as the "Help Information") is contained in separate

— 445

(proximity)

First Experience

Fig. 11

Sample Notebook: Contents ← 1 →

Document  Edit  Create  View  Show  Sort

Name                                     Page
- First Experience ............ ▷ 2
- Samples ................... ▷ 3
- Application ............... ▷ 6
- Reports ................... ▷ 7

440      380      445

Application    6

Document  Edit  Insert  Case  Format

The present invention describes methods and apparatus for a stylus-driven computer. Said computer presents the behavior of a multi-page notebook including visible pages, page-turn effects, tabbed bookmarks along one or more edge, "floating" pages temporarily removed from their notebook location, a table-of-contents, and contents of sub-sections. Each page in the notebook contains one document which may contain many physical pages when printed. These pages are analogous to data files in other computers and may contain different types of documents such as text, drawings, FAX images, or specialized forms. Some information (such as the "Help Information") is contained in separate (proximity)

Contents | First Experience | Samples

Fig. 12

Application ← 6 →

Document Edit Insert Case Format

545 — About...
Print...
Print Setup...
Send...
Export...
Revert nt invention describes methods and stylus-driven computer. Said computer havior of a multi-page notebook including age-turn effects, tabbed bookmarks re edge, "floating" pages temporarily eir notebook location, a s, and contents of sub-sections. Each book contains one document which may ysical pages when printed. These qous to data files in other computers and may contain different types of documents such as text, drawings, FAX images, or specialized forms. Some information (such as the "Help Information") is contained in separate notebooks with all of the features listed above. The primary means of control of the computer is a rich set of gestures with the stylus over almost any object visible on the display. Gestures with a stylus offer a more concise vocabulary than tradition pointing devices because they combine both selection (by their location) and meaning (the specific gesture) in one movement. A common set of gestures can delete, move, copy, or edit diverse objects such as text fragments, buttons, documents, or entire notebooks. Gestures can initiate the insertion of hand-written text, the editing of existing text, page-turning, scrolling within a window, zooming or shrinking of entire pages, selection, summoning of windows containing operator guidance, or the creation of links ("goto" buttons) to other pages.

The proximity of the stylus to the display's front surface is used to anticipate and terminate stylus input events. By sensing both the proximity of the stylus tip to, and contact with, the display surface the user-interface software can more accurately discern the vertical Contents | First Experience | Samples First Experience

Fig. 19

Application ← 6 →

Document Edit Insert Case Format

The present invention describes methods and apparatus for a stylus-driven computer. Said computer presents the behavior of a multi-page notebook including visible pages, page-turn effects, tabbed bookmarks along one or more edge, "floating" pages temporarily removed from their notebook location, a table-of-contents, and contents of sub-sections. Each page in the notebook contains one document which may contain many physical pages when printed. These pages are ana[lyzed by] computers and may conte[xt...] ents such as text, drawings,[...] forms. Some information (s[...]") is contained in separate no[...] es listed above. The pr[...] e computer is a rich set of ge[...] lmost any object visible o[...] a stylus offer a more concis[...] ointing devices because they combine both selection (by their location) and meaning (the specific gesture) in one movement. A common set of gestures can delete, move, copy, or edit diverse objects such as text fragments, buttons, documents, or entire notebooks. Gestures can initiate the insertion of hand-written text, the editing of existing text, page-turning, scrolling within a window, zooming or shrinking of entire pages, selection, summoning of windows containing operator guidance, or the creation of links ("goto" buttons) to other pages.

The proximity of the stylus to the display's front surface is used to anticipate and terminate stylus input events. By sensing both the proximity of the stylus tip to, and contact with, the display surface the user-interface software can more accurately discern the vertical

630 — pages  pager  paves
cages  pales  rages
gages  panes  sages
paces  pares  wages
paged  pates p a g e s Contents | First Experience | Samples First Experience

Fig. 23

> Application      ← 6 →
>
> Document Edit Insert Case Format
>
>     The present invention describes methods and apparatus for a stylus-driven computer. Said computer presents the behavior of a multi-page notebook including visible pages, *page-turn effects*, tabbed bookmarks along one or more edge, "floating" pages temporarily removed from their notebook location, a table-of-contents, and contents of sub-sections. Each page in the notebook contains one document which may contain many physical pages when printed. These pages are analogous to data files in other computers and may contain different types of documents such as text, drawings, FAX images, or specialized forms. Some information (such as the "Help Information") is contained in separate notebooks with all of the features listed above. The primary means of control of the computer is a rich set of gestures with the stylus over almost any object visible on the display. Gestures with a stylus offer a more concise vocabulary than tradition pointing devices because they combine both selection (by their location) and meaning (the specific gesture) in one movement. A common set of gestures can delete, move, copy, or edit diverse objects such as text fragments, buttons, documents, or entire notebooks. Gestures can initiate the insertion of hand-written text, the editing of existing text, page-turning, scrolling within a window, zooming or shrinking of entire pages, selection, summoning of windows containing operator guidance, or the creation of links ("goto" buttons) to other pages.
>
>     The proximity of the stylus to the display's front surface is used to anticipate and terminate stylus input events. By sensing both the proximity of the stylus tip to, and contact with, the display surface the user-interface software can more accurately discern the vertical 740 → (pointing to "page-turn effects")

Tabs: Contents | First Experience | Samples

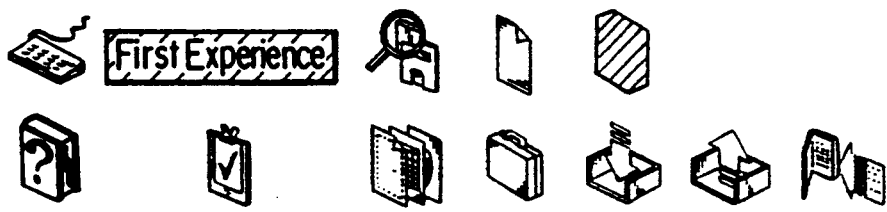

Fig. 29

| Application | ← 6 → |

Document Edit Insert Case Format

The present invention describes methods and apparatus for a stylus-driven computer. Said computer presents the behavior of a multi-page notebook including 760 ⟩ page-turn effects, visible pages, tabbed bookmarks along one or more edge, "floating" pages temporarily removed from their notebook location, a table-of-contents, and contents of sub-sections. Each page in the notebook contains one document which may contain many physical pages when printed. These pages are analogous to data files in other computers and may contain different types of documents such as text, drawings, FAX images, or specialized forms. Some information (such as the "Help Information") is contained in separate notebooks with all of the features listed above. The primary means of control of the computer is a rich set of gestures with the stylus over almost any object visible on the display. Gestures with a stylus offer a more concise vocabulary than tradition pointing devices because they combine both selection (by their location) and meaning (the specific gesture) in one movement. A common set of gestures can delete, move, copy, or edit diverse objects such as text fragments, buttons, documents, or entire notebooks. Gestures can initiate the insertion of hand-written text, the editing of existing text, page-turning, scrolling within a window, zooming or shrinking of entire pages, selection, summoning of windows containing operator guidance, or the creation of links ("goto" buttons) to other pages.

The proximity of the stylus to the display's front surface is used to anticipate and terminate stylus input events. By sensing both the proximity of the stylus tip to, and contact with, the display surface the user-interface software can more accurately discern the vertical

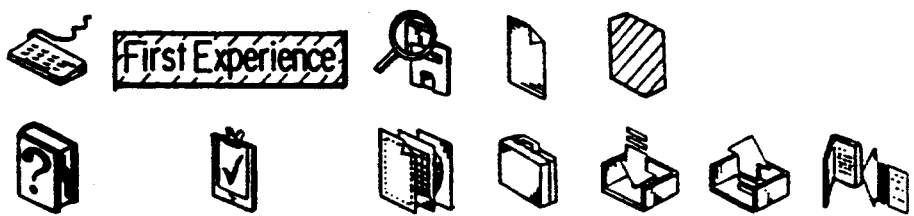

Fig. 31

Sample Notebook: Contents ← 1 →

Document  Edit  Create  View  Show  Sort

| Name | Page |
|---|---|
| ▢ First Experience | ▷ 2 |
| ▢ Samples | ▷ 3 |
| ▢ Application | ▷ 6 |
| ▢ Reports | ▷ 7 |

800

[proximity]

Core

| | | |
|---|---|---|
| Tap | ■ | Select/Invoke |
| Press-hold | | Initiate Drag (Move, Wipe-Thru) |
| Tap-Hold | | Initiate Drag (Copy) |
| Flick (4 directions) | ∎ | Scroll to Edge |
| Cross-Out | ✕ | Delete |
| Circle | ○ | Edit |
| Check | ✓ | Options |
| Caret | ∧ | Insert |
| Bracket (Left & Right) | [ ] | Select Object, Adjust Selection |
| Pigtail | ℘ | Delete Character |
| Down-Right | L | Insert Space |

Capital Letters

| | |
|---|---|
| Capital Letters A-Z | Context-Specific Accelerators |

Other

| | | |
|---|---|---|
| Double-Tap | ∙∙ | Select Word, Open Icon, Float Page |
| Triple-Tap | ∙∙∙ | Select Sentence |
| Quad-Tap | ∙∙∙∙ | Select Paragraph |
| Plus | + | Toggle Selection, Sum |
| Square | □ | Select Region |
| Scratch-Out | | Delete |
| Circle-Line | ⊖ | Replace Word(s) |
| Caret-Tap | ∧˙ | Create Input Pad |
| Double-Caret | ∧∧ | Create Embedded Doc |
| Circle-Tap | ⊙ | Create Link Button |
| Arrows (Up & Down) | ↑↓ | Bigger/Smaller |
| Double-Flick (4 directions) | ∥ | Scroll Farther |
| Triple-Flick (4 directions) | ∥∣ | Scroll Farther Still |
| Quad-Flick (4 directions) | ∥∥ | Scroll Farthest |
| Up-Right | Γ | Insert Character |
| Down-Left | ⌐ | Insert Para. Break |
| Down-Left Flick | | Insert Line Break |
| Down-Right Flick | L | Insert Tab |
| Right-Up | ⌐ | Initial Caps |
| Right-Up Flick | | Upper Case |
| Right-Down | ⌐ | Lower Case |
| Check-Tap | ✓∙ | Options for Container |
| Questionmark | ? | Quick Help |

FIG. 45

Eggplant dip ⟋— 632
(We'll need a catchy name for this.) This is a variation on babaganoush that I think will stand up well to long-term shelf storage. It involves roasting the eggplants (which we can do in bulk) and then smashing them with garlic, lemon, olive oil and spices. We currently have some problems with the oil separating out to the top of the jar, which is very unappetizing, but I'm sure we can find a binding agent to solve this.

Eggplant dip ╱— 633
(We'll need a catch name for this.) This is a variation on

Eggplant dip
(We'll need a catch name for this.) This is a variation on
— 631

Eggplant dip
(We'll need a catch name for this.) T his is a variation on
╱— 634      — 631A

Eggplant dip
(We'll need a catch name for this.) This is a variation on

 — 635

Eggplant dip
(We'll need a catch name for this.) This is a variation on

Eggplant dip
(We'll need a catchy name for this.) This is a variation
— 635A

Fig. 46

Eggplant dip
(We'll need a catchy name for this.) This is a variation

↘ 636

Eggplant dip          ⌐637
(We'll need a catchy name ⌐
for this.) This is a variation on babaganoush that I think

Eggplant dip
(We'll need a catchy name for this.) This is a variation
on babaganoush that I think will stand up well to
long-term shelf storage. It involves roasting the eggplants
(which we can do in bulk) and then smashing them with
garlic, lemon, olive oil and spices. We currently have  638
some problems with the oil separating out to the top of
the jar, which is very unappetizing, but I'm sure we can
find a binding agent to solve this.

Eggplant dip
(We'll need a catchy name for this.) This is a variation
on babaganoush that I think will stand up well to
long-term shelf storage. It involves roasting the eggplants
(which we can do in bulk) and then smashing them with
garlic, lemon, olive oil and spices.} 639

We currently have some problems with the oil separating
out to the top of the jar, which is very unappetizing, but
I'm sure we can find a binding agent to solve this.

Eggplant dip
⌐ ↘ 640
(We'll need a catchy name for this.) This is a variation ⌐ Eggplant dip
641 ⌐
(We'll need a catchy name for this.) This is a variation

Fig. 47

Eggplant dip ⌐↙ 642

Eggplant Dip ⌐ 643

Eggplant ~~Dip~~ ⌐ 644

Eggplant dip ⌐ 645

Eggplant ~~dip~~ ⌐ 646

Eggplant DIP ⌐ 647

Fig. 48

Package Design Letter ← 4 →

Document  Edit  Insert  Case  Format

FastPak Design
3535 Mission St.
Houston TX 45321

RE: New package design

Dear Ms. Huerta:

We need a new design for the plastic bottles for our condiments.

Recently, an executive of a supermarket chain took a box of our samples home in order to try them before ordering our line. He briefly left the box on the kitchen floor where his son ran into it with a tricycle. — 629

Our bottles should be able to withstand the impact from a tricycle powered by a three year old. But four bottles of our new salsa broke, spilling their contents all over the floor.

The executive never got a chance to try our product.

Can you design a lightweight, recyclable, 8 oz. plastic bottle that won't break under moderate impact? I'll be travelling next week, but you can fax me suggested proposals at 415/ 345-9833.

Sincerely,

Package Design Letter ← 4 →

Document  Edit  Insert  Case  Format

FastPak Design
3535 Mission St.
Houston TX 45321

RE: New package design

Dear Ms. Huerta:

We need a new design for the plastic bottles for our condiments.

Recently, an executive of a supermarket chain took a box of our samples home in order to try them before ordering. He briefly left the box on the kitchen floor where his son ran into it with a tricycle.

Our bottles should be able to withstand the impact from a tricycle powered by a three year old. But four bottles of our new salsa broke, spilling their contents all over the floor.

The executive never got a chance to try our product.

Can you design a lightweight, recyclable, 8 oz. plastic bottle that won't break under moderate impact? I'll be travelling next week, but you can fax me suggested proposals at 415/ 345-9833.

Sincerely,

Tabs: Contents, Samples, Staff, Widget Inc., Current, Personal, To Do, Done, Calendar, Phone

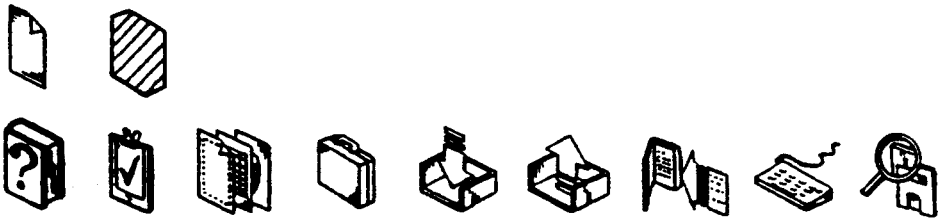

| Sample Notebook: Contents | ← 1 → |
|---|---|
| Document  Edit  Create  View  Show  Sort | |

| Name | Page |
|---|---|
| 🗋 Samples | ▷ 2 |
|    🗋 New Product Ideas | ▷ 3 |
|    🗋 Package Design Letter | ▷ 4 |
| 🗋 Staff | ▷ 5 |
| 🗋 Widget Inc. | ▷ 13 |
| 🗋 ABC Co. | ▷ 21 |
| 🗋 XYZ Ltd. | ▷ 29 |
| 🗋 Current | ▷ 37 |
| 🗋 Personal | ▷ 42 |
| 🗋 Blank Paper | ▷ 51 |
| 🗋 To Do | ▷ 54 |
| 🗋 Done | ▷ 57 |
| 🗋 Phone Book | ▷ 61 |
| 🗋 Index | ▷ 62 |

Tabs: Contents | Samples | Staff | Widget Inc. | Current | Personal | To Do | Done | Phone | Index

Fig. 54

Dear Ms. Huerta:

We need a quick new design for the plastic bottles for our condiments.

Dear Ms. Huerta:

We need a quick new des∮n for the plastic bottles for our condiments. ← 653

Dear Ms. Huerta:

We need a quick new design for the plastic bottles for our condiments.

Fig. 55

Package Design Letter ← 4 →

Document  Edit  Insert  Case  Format

New World Foods
19271 Palm Blvd.
Los Angeles, CA 90036

February 17, 1991

Ms. Elena Huerta
FastPak Design
3535 Mission St.
Houston TX 45321

RE: New package design

Dear Ms. Huerta

We need a quick new design for the plastic bottles for our condiments.

655 —

Recently, an executive of a supermarket chain took a box of our samples home in order to try them before ordering. He briefly left the box on the kitchen floor where his son ran into it with a tricycle.

Our bottles should be able to withstand the impact from a tricycle powered by a three year old. But four bottles of our new salsa broke, spilling their contents all over the floor.

The executive never got a chance to try our product.

Can you design a lightweight, recyclable, 8 oz. plastic bottle that won't break under moderate impact? I'll be travelling next week, but you can fax me suggested

*Tabs: Contents, Samples, Staff, Widget Inc., Current, Personal, To Do, Done, Phone, Index*

Fig. 56

| Package Design Letter ← 4 → |

Document  Edit  Insert  Case  Format

New World Foods
19271 Palm Blvd.
Los Angeles, CA 90036

February 17, 1991

Ms. Elena Huerta
FastPak Design
3535 Mission St.
Houston TX 45321

RE: New package design

Dear Ms. Huerta:

We need a quick new design for the plastic bottles for our condiments.

🖉 Drawing Paper ←—— 655 B

Recently, an executive of a supermarket chain took a box of our samples home in order to try them before ordering. He briefly left the box on the kitchen floor where his son ran into it with a tricycle.

Our bottles should be able to withstand the impact from a tricycle powered by a three year old. But four bottles of our new salsa broke, spilling their contents all over the floor.

The executive never got a chance to try our product.

Can you design a lightweight, recyclable, 8 oz. plastic bottle that won't break under moderate impact? I'll be

Fig. 57A

Package Design Letter ← 4 →

Document  Edit  Insert  Case  Format

FastPak Design
3535 Mission St.
Houston TX 45321

RE: New package design

Dear Ms. Huerta:

We need a new design for the plastic bottles for our condiments.

661 ──────→ ∧

Recently, an executive of a supermarket chain took a box of our samples home in order to try them before ordering. He briefly left the box on the kitchen floor where his son ran into it with a tricycle.

Our bottles should be able to withstand the impact from a tricycle powered by a three year old. But four bottles of our new salsa broke, spilling their contents all over the floor.

The executive never got a chance to try our product.

Can you design a lightweight, recyclable, 8 oz. plastic bottle that won't break under moderate impact? I'll be travelling next week, but you can fax me suggested proposals at 415/ 345-9833.

Sincerely,

Fig. 61

Package Design Letter ← 4 →

Document  Edit  Insert  Case  Format

New World Foods
19271 Palm Blvd.
Los Angeles, CA 90036

February 17, 1991

Ms. Elena Huerta
FastPak Design
3535 Mission St.
Houston TX 45321

RE: New package design

Dear Ms. H 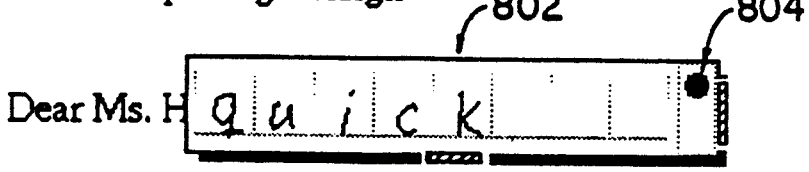

We need a new design for the plastic bottles for our condiments.

Recently, an executive of a supermarket chain took a box of our samples home in order to try them before ordering. He briefly left the box on the kitchen floor where his son ran into it with a tricycle.

Our bottles should be able to withstand the impact from a tricycle powered by a three year old. But four bottles of our new salsa broke, spilling their contents all over the floor.

The executive never got a chance to try our product.

Can you design a lightweight, recyclable, 8 oz. plastic bottle that won't break under moderate impact? I'll be travelling next week, but you can fax me suggested

Fig. 64

Package Design Letter ← 4 →

Document  Edit  Insert  Case  Format

New World Foods
19271 Palm Blvd.
Los Angeles, CA 90036

February 17, 1991

Ms. Elena Huerta
FastPak Design
3535 Mission St.
Houston TX 45321

RE: New package design

Dear Ms. Huerta:

We need a quick new design for the plastic bottles for our condiments.

Recently, an executive of a supermarket chain took a box of our samples home in order to try them before ordering. He briefly left the box on the kitchen floor where his son ran into it with a tricycle.

Our bottles should be able to withstand the impact from a tricycle powered by a three year old. But four bottles of our new salsa broke, spilling their contents all over the floor.

The executive never got a chance to try our product.

Can you design a lightweight, recyclable, 8 oz. plastic bottle that won't break under moderate impact? I'll be travelling next week, but you can fax me suggested

*Tabs: Contents, Samples, Staff, Widget Inc., Current, Personal, To Do, Done, Phone, Index*

Fig. 65

| Package Design Letter ← 4 → |
|---|
| Document  Edit  Insert  Case  Format |

New World Foods
19271 Palm Blvd.
Los Angeles, CA 90036

February 17, 1991

Ms. Elena Huerta
FastPak Design
3535 Mission St.
Houston TX 45321

RE: New package design

Dear Ms. Huerta:

We need a quick new design for the plastic bottles for our condiments.

Recently, an executive of a supermarket chain took a box of our samples home in order to try them before ordering. He briefly left the box on the kitchen floor where his son ran into it with a tricycle.

Our bottles should be able to withstand the impact from a tricycle powered by a three year old. But four bottles of our new salsa broke, spilling their contents all over the floor.

The executive never got a chance to try our product.

Can you design a lightweight, recyclable, 8 oz. plastic bottle that won't break under moderate impact? I'll be travelling next week, but you can fax me suggested

*Tabs: Contents, Samples, Staff, Widget Inc., Current, Personal, To Do, Done, Phone, Index*

Fig. 68

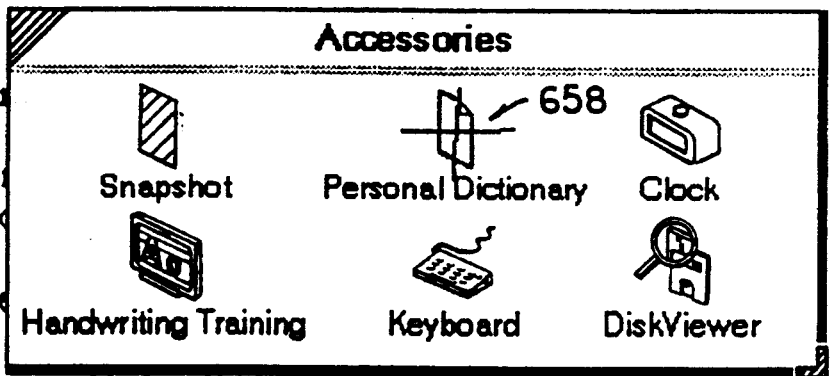
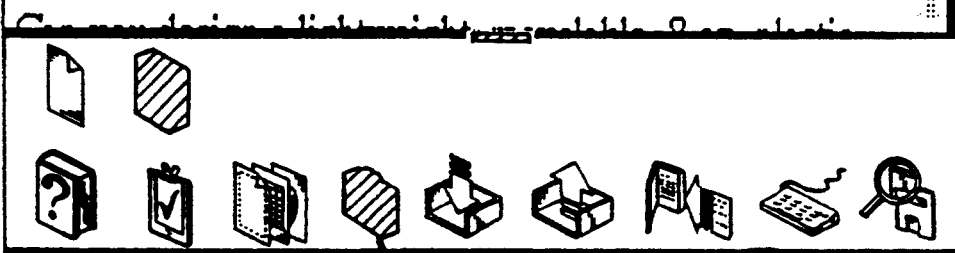
Fig. 70

CONTROL OF A COMPUTER THROUGH A POSITION-SENSED STYLUS

BACKGROUND OF THE INVENTION

Recently a new class of computer has begun to emerge. This type of computer uses an electronically-sensed pen or stylus and handwriting recognition in place of a keyboard as the primary input device. Typically in such a pen-driven computer the movement of the stylus is tracked over a flat-screen bit-mapped display. As the computer tracks the stylus it displays images which mimic various real-world objects. In this way the interaction between the stylus and the screen simulates "paper", "ink", "push buttons," and other visual metaphors.

The present invention addresses the problem of controlling such a computer through a stylus. In this application the word stylus is used to mean a pen-like object whose position and contact with a surface can be continuously detected electronically. In the prior art it has been found that a computer can be made easier to use if it displays symbols that mimic the behavior of actual objects. For example, the Macintosh computer from Apple Computer uses simplified pictures or icons to represent documents, folders, and trash cans to present a metaphor for a desk top. The icons are manipulated by using a mouse to move a pointer on the screen to select and possibly drag these icons to new positions.

In the prior art the use of a mouse offers only a limited control vocabulary, basically pointing, dragging, clicking, and double clicking. More complex operations require the user to resort to the keyboard or choices from a menu. For example in a word processor program text is moved in a four step operation. First the desired phrase is selected by dragging the text cursor with the mouse, second the "cut" command is selected, third the text cursor is moved with the mouse, and fourth the "paste" command is selected. A copy operation requires a similar four-step process.

Certain systems substitute a stylus for a mouse, as described, for instance, in "Digitizing Tablets" PC Magazine, Nov. 28, 1989. Other systems have implemented stylus-controlled notepad computers, as described in "Linus Write-Top User's Guide" (1987) from Linus Technologies, Inc. of Reston, Va. and "Gridpad Computer Owner's Guide" (1990) from Grid Systems Corporation of Fremont, Calif. Each of the foregoing references is incorporated herein by reference.

In earlier systems, when a stylus has been used as a substitute for a mouse, the stylus emulates the limited behavior of a mouse with little or no change in the controlling software. The existing notepad computers also use the stylus in a limited way but add the recognition of handwritten input and one or two editing gestures which operate only within text.

There are problems in the initiation and termination of "input events" in these existing stylus-driven computers. For the purposes of this application, the term "input event" refers to one or more strokes which comprise one complete expression, such as a tap, caret, letter, word, or phrase. A "button" is a region of the display demarcated by shading or outline and sensitive to some small set of simple gestures such as tapping.

In certain systems (such as the Grid and Linus designs the mentioned above), an event begins when the stylus touches the front surface of the display. Input is then terminated in one of three ways: (a) by lifting the stylus from the surface; (b) by a series of strokes followed by a final lift of the stylus and lack of contact for a specific time interval, or "timeout"; or (c) by a series of strokes after which a specific region of the display (such as a button) is touched.

Typically, technique (a) is used when the input event is a simple gesture, such as tapping a button. Technique (a) can also be used to terminate the input of a single-stroke editing symbol such as a strike-through, circle, or caret.

Technique (b) would typically be used to signal the end of entry of a single character or multi-stroke editing gesture. To terminate the entry of many symbols reliably (where the operator can be expected to pause during input), option (c) must be used to explicitly indicate completion.

Each of these stylus (as opposed to mouse) techniques has its problems. In technique (a), the input event is typically begun by placing the stylus tip on a desired button or other feature. However, selection of an individual button is difficult when there are many small buttons close to one another. An example of this is in a "sketching" program, where objects are manipulated by tapping or dragging small buttons or "handles" at their extremities. In such a program, a rectangle would have handles at each corner while a curve would have handles at each inflection point. For a screen with many small objects or curves with many bends, the selection of a desired handle can be difficult, because there is no way to preview which handle is targeted.

An additional problem in accurate pointing with the stylus is the parallax caused by the separation of the surface that the stylus tip contacts and the active layer of the display. This problem is not found in mouse-based systems, because a cursor or arrow is drawn on the display to represent the position of the mouse.

Technique (a) cannot be used to recognize the end of a multi-stroke gesture or character. This forces the designer into the use of timeouts, i.e. technique (b). However, the use of timeouts does not provide as smooth an interaction with the user, because the interval is commonly either too long or too short for a given individual or circumstance. The user must be conscious of the timeout interval, and alternately feels that he must race through the input task or delay excessively at the completion of the task.

Given the limitations of these two techniques, designers using prior art were often forced into using technique (c): explicit termination by selecting a button. But using this technique yields a host of problems. Finding room on the display to locate such a button is often difficult. In one area where notepad computers will be applied—hand entry of data into electronic forms—it is desirable for these computer-simulated forms to look and act much like a paper form. Using prior art, a termination button must be provided to trigger recognition and validation of the user's input for each field. Thus, for a typical form containing many fields an unnecessary amount of space on the display is given over to these termination buttons.

In addition, a form requiring the triggering of a button upon completing entry in a given field does not act like a paper form; a paper form is different in that it is "mode-less," i.e. the user may skip from field to field at will. Thus, the use of technique (c) impairs the user interface by making it less intuitive.

The above summary shows that present computers do not fully exploit the possibilities of user interaction with a computer using a stylus.

SUMMARY OF THE INVENTION

The present invention describes methods and apparatus for a stylus-driven computer in a notebook metaphor. Thus, the computer presents the behavior of a metaphorical multi-page notebook including visible pages, page-turn effects, tabbed bookmarks along one or more edge, "floating" pages temporarily removed from their notebook location, a table of contents, and contents of subsections.

Each page in the notebook contains one document which may contain many physical pages when printed. These pages are analogous to data files in other computers and may contain different types of documents such as text, drawings, facsimile images, or specialized forms. Some information (such as the "Help Information") is contained in separate notebooks with all of the features listed above.

The primary means of control of the computer is a set of numerous gestures drawn with the stylus over almost any object visible on the display. Gestures with a stylus offer a more concise vocabulary than traditional pointing devices because they combine, into one movement, both: (1) selection of text or other portion of a document, as controlled by the location of the gesture on the screen or display; and (2) the meaning of the gesture or the specific command to be executed, which is determined by the particular gesture which is made.

A single set of gestures is used in the present invention to delete, move, copy, or edit diverse objects such as text fragments, buttons, documents, or entire notebooks. Gestures are used to initiate the insertion of hand-written text, the editing of existing text, page-turning, scrolling within a window, zooming or shrinking of entire pages, selection, summoning of windows containing operator guidance, or the creation of links ("goto" buttons) to other pages.

The proximity of the stylus to the display's front surface is used to anticipate and terminate stylus input events. By sensing both the proximity of the stylus tip to the display surface and the contact with the display surface, the user-interface software can more accurately discern the vertical movement of the stylus, provide a richer vocabulary of stylus movements for control of the computer, and offer better feedback to the user.

When using the stylus for selection, movement of the stylus into proximity can trigger display events which give the user a preview of what display objects are understood by the computer to be targeted. For example, the computer can expand or alter the appearance of a button in anticipation of its selection. This technique overcomes the problems of selecting displayed objects due to tight spacing and parallax effects in prior art.

In the entry of multi-stroke graphical objects the sensing of the departure of the stylus tip from the vicinity of the display surface allows the computer to discern the natural movement of the operator's hand at the end of drawing and initiate processing or recognition. Such drawn objects may include editing gestures, geometric figures, or handwriting. This use of proximity transitions for the termination of input events eliminates the problems found in prior art caused by the use of loss-of-contact, timeouts, or buttons.

The operating software of the computer presents a Graphical User Interface (GUI) for the control of the computer. In a GUI the computer displays small pictures or icons representing various familiar, real-world objects such as file folders, trash cans, buttons, slide controls, paint brushes, erasers, and pencils.

In prior art (Xerox Star, Apple Macintosh, Microsoft Windows and Presentation Manager), the icons have been chosen to simulate a desktop which uses the manipulation of files and folders as a metaphor for control of computer programs and files. In the present invention, a "notebook" metaphor is chosen as being more intuitive in controlling a portable, hand-held, stylus driven computer. This metaphor provides a coherent, familiar means of organizing and accessing data. Features such as numbered and titled pages, tables of contents, section dividers, and tabs mimic the operation of their real counterparts and allow a user to peruse the data held in the computer with little or no training.

The notebook metaphor allows a more structured arrangement of documents than the somewhat free-format desktop metaphor. Related documents can be place in a section on adjacent pages, and a simple gesture used to turn from one page to another. The ability of the user to place a tab on any document allows the user to turn to that page instantly.

Another advantage of the notebook metaphor is the matching in scale of the icons to their physical counterparts. For example, in the present invention a simulated page tab is roughly the size of an actual page tab. This is important because the stylus must interact with these icons and is the size of, and is manipulated with the accuracy of, an actual pen or pencil.

The implementation of the actual "notebook" GUI software can be based on any one of many prior inventions. Information in this area can be found in *Inside Macintosh, Fundamentals of Interactive Computer Graphics, SmallTalk-80, The Language and Its Implementation* (all from Addison-Wesley Publishing Co.), "The X Window System" (*ACM Transactions on Graphics*, Vol. 5, No. 2, April 1986, pages 79–109) or "Andrew: A Distributed Personal Computing Environment" (*Communications of the ACM*, March 1986). The actual techniques used to recognize both gestures and handwritten input will not be discussed in detail here, but may be found in "Automatic Recognition of Handprinted Characters—The State of the Art" *Proceedings of the IEEE*, pages 469–487, Vol. 68, No. 4, April 1980. The foregoing references are incorporated herein by reference.

Attached hereto as Appendices I-V are detailed documentation of an actual implementation applicant's system. These appendices are all from GO Corporation of Foster City, Calif., and are entitled:

I. Architecture—Parts 0 to 5
II. Architecture—Parts 6 to End
III. Application Developer's Guide
IV. API Reference.

The Appendices are supplied to demonstrate one actual working example of a system utilizing applicant's invention, and there may be many other, different realizations of the invention which still incorporate the features discussed above and described in detail below.

Another patent application which includes disclosure which may be used in conjunction with the present invention is the United States patent application of Carr et al., entitled "Computer Documents as Compound Documents in a Notebook Metaphor," Ser. No. 07/607,139, filed Oct. 31, 1990. That application is incorporated herein by reference.

Another copending application which complements the disclosure herein is the United States patent application of Hullender entitled "Method For Pattern Recognition," Ser. No. 07/607,125, filed on Oct. 31, 1990 now U.S. Pat. No. 5,151,950. That application is also incorporated herein by reference.

BRIEF DESCRIPTION OF THE DRAWINGS

FIG. 6 shows an expanded table of contents.

FIG. 7 shows a floating page above the table of contents.

FIG. 8 shows a floating page with the resize handle visible.

FIG. 9 shows the resizing of a floating page.

FIG. 10 shows the resulting resized floating page.

FIG. 11 shows the dragging of a floating page.

FIG. 12 show the result of dragging a floated page.

FIG. 19 shows the "Document" menu.

FIG. 23 shows a pop-up proofing pad.

FIG. 29 shows text selected for movement in a document.

FIG. 31 shows the result of moving text.

FIG. 34 shows an insertion gesture in the table of contents.

FIG. 44 shows a computerized form.

FIG. 45 is a table of gesture commands of the present invention.

FIGS. 46–48 are partial screen shots from the notebook 2, showing various gestures and the results of using them on text.

FIGS. 51–72 illustrate the use of numerous gestures of the invention as computer commands.

DETAILED DESCRIPTION OF THE PREFERRED EMBODIMENTS

Figure 1:
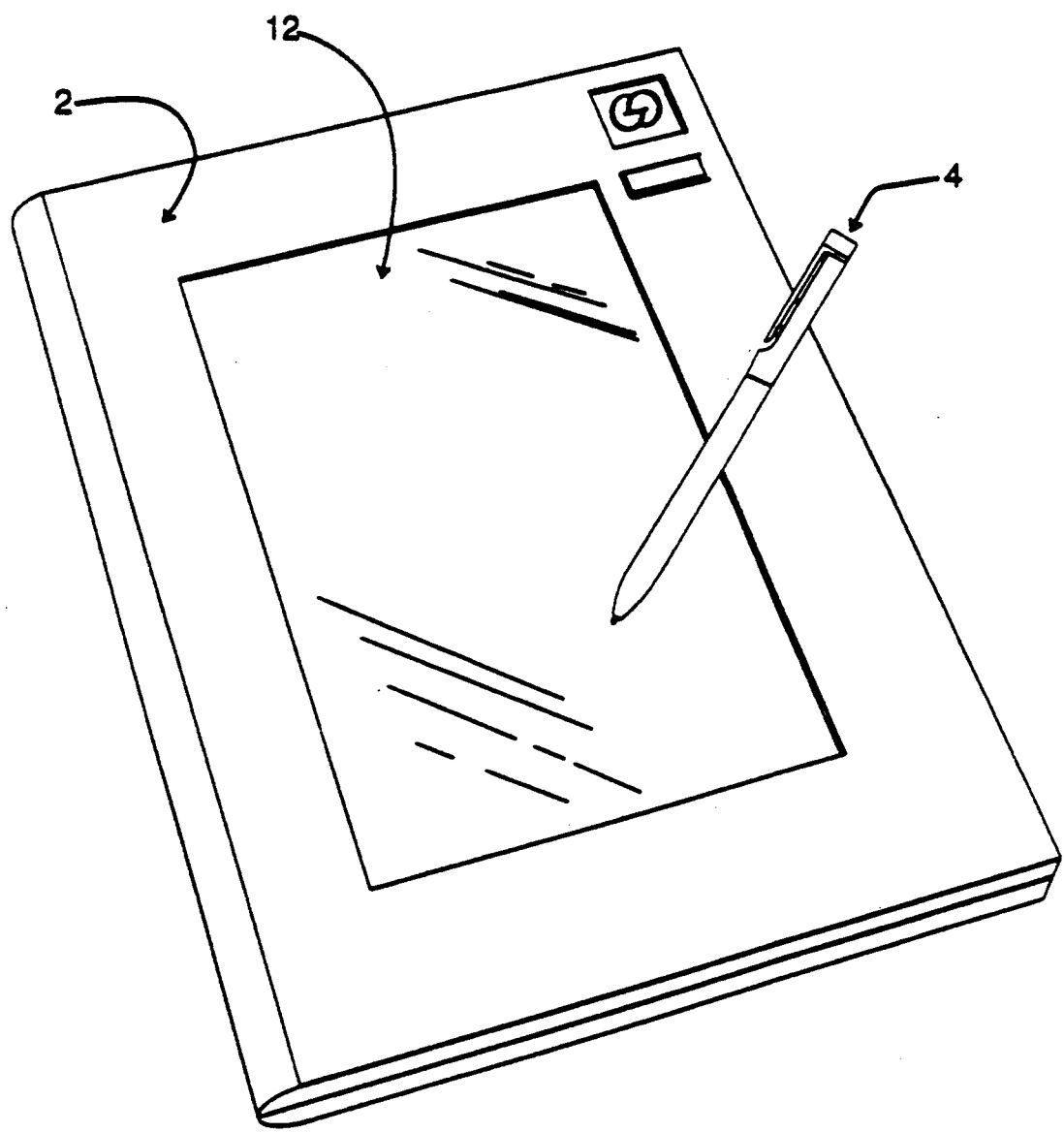
FIG. 1 is an overall view of a notebook computer.
Figure 2:
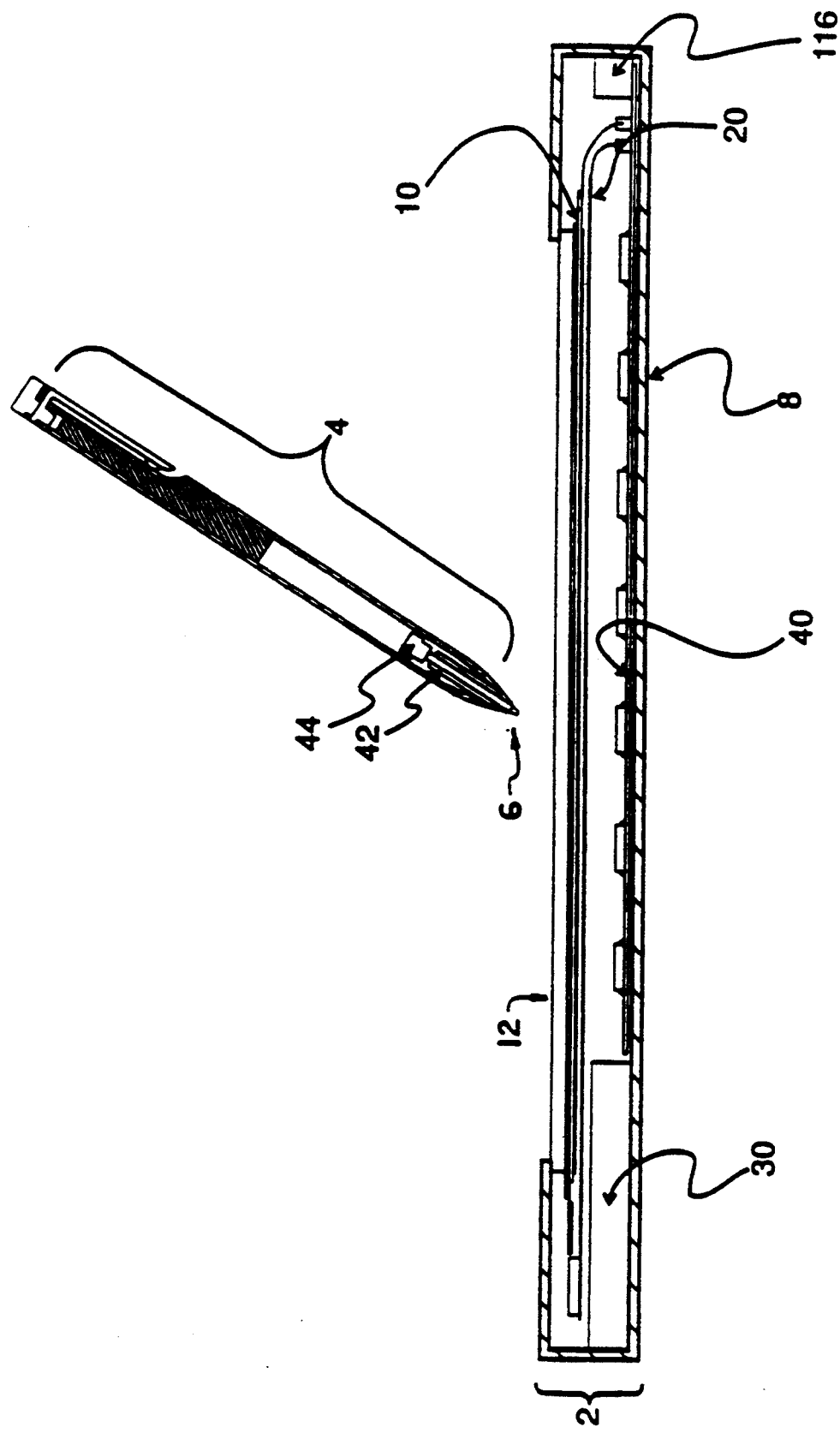
FIG. 2 is a cross-section of a notebook computer according to the present invention.

FIG. 1 shows the initial embodiment of the invention. This implementation is a portable, battery-operated notebook computer 2 with, preferably, the height and width of a standard legal notepad. (The invention may also be implemented in other, non-portable computers.) As shown in FIG. 2, a stylus 4 having a tip 6 is utilized with the notebook computer 2, in a manner to be described below.

FIG. 2 shows the internal mechanical layout of the computer 2. Liquid crystal display 10 is mounted as the front surface of the unit. Mounted behind the display is the pen position digitizer 20. A rechargeable battery pack 30 snaps into a slot on the lower bottom of the computer and the main printed circuit board 40 mounts on the inside of the rear case 8 of the computer 2.

The pen or stylus 4 contains a radio frequency inductor/capacitor circuit 42 and a switch 44 which closes on pen-down and changes the resonant frequency. This may be in accordance with the disclosure in the U.S. Pat. No. 4,786,765 to Yamanami et al., which is incorporated herein by reference.

Figure 3:
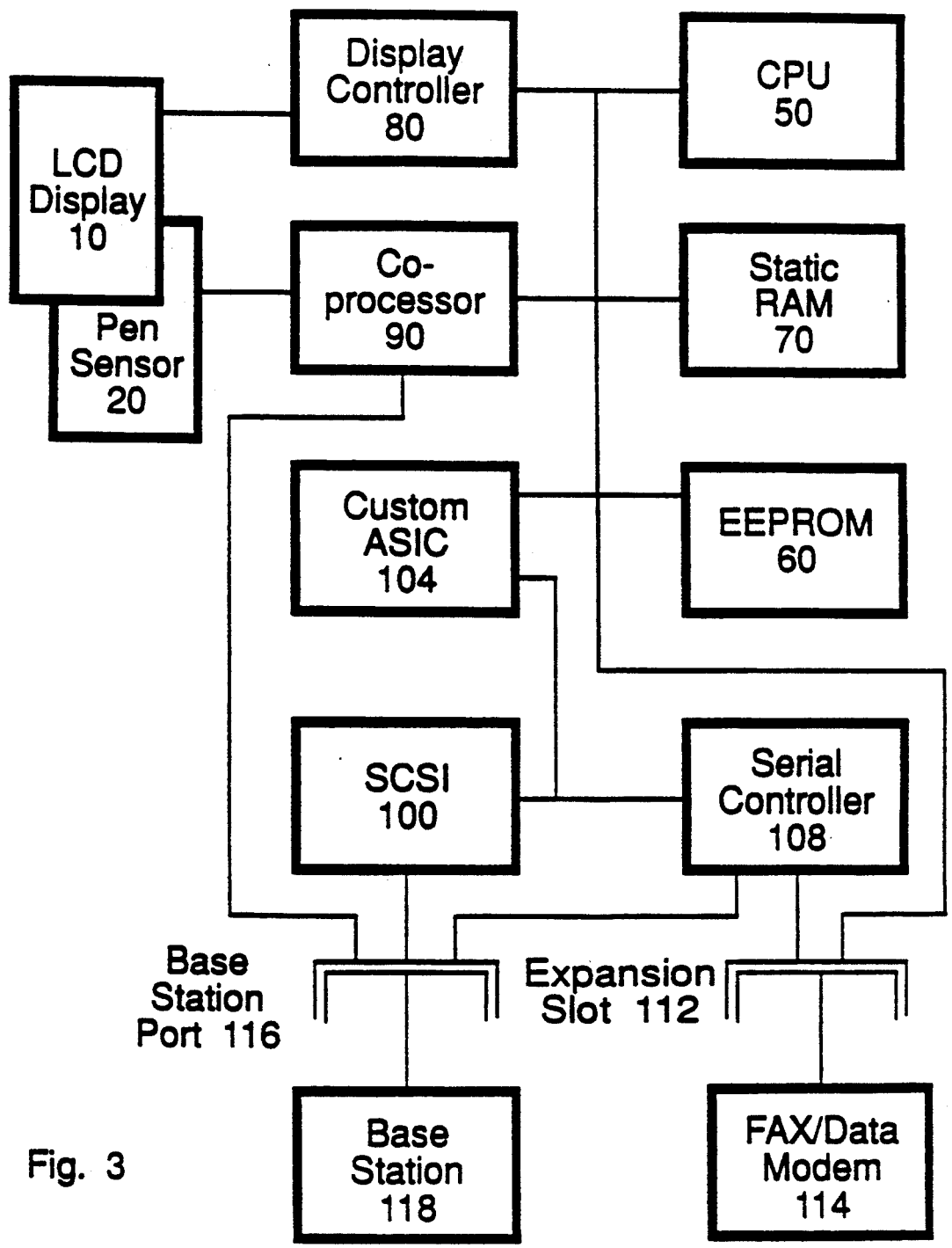
FIG. 3 is a block diagram of the computer's components.

FIG. 3 is a block diagram of the internal architecture of the notebook computer 2. An Intel 80286 microprocessor 50 connects to the following subsystems: 1–2 megabytes of flash EPROM 60; 1–4 megabytes of static RAM 70; an LCD display controller 80; a pen position digitizer co-processor 90; a Small Computer Systems Interface (SCSI) expansion port 100; a custom Application Specific Integrated Circuit (ASIC) 104 (containing direct memory access and interrupt logic); and a dual-channel serial input-output integrated circuit 108. The expansion slot 112 is designed to accept modules containing additional I/O devices, such as a modem 114 or expansion memory (not shown). The base station port 116 is intended for connecting to a base station 118, which may comprise external disk drives, power supplies, a keyboard, and a local area network (LAN).

The display 10 can be any one of many commercially available units which contain an array of 400 by 640 picture elements (pixels), each of which can display four shades of gray. Such displays are available from Toshiba, Hitachi, and Sharp.

Although in certain designs (such as those that have been available from Grid Systems Corporation and Linus Technologies, Inc.), resistive, transparent digitizers have been mounted in front of the display, it is desirable to use a digitizer which does not require contact with the stylus. A digitizer based on non-contacting technology can be mounted behind the display, and thus eliminates one transparent layer above the display.

The present invention senses when the stylus is in proximity to or in contact with the front surface of the computer. Digitizers capable of this are available from Summagraphics, CalComp and Wacom. The Wacom unit is especially desirable because it provides a cordless, lightweight stylus which does not require an internal power source, as described in the above-mentioned '765 patent to Yamanami et al.

Gestures as Commands for the Notebook Metaphor Computer

The notebook computer is completely controllable through gestures and printed characters drawn on the display with the electronic stylus. Unlike the click of a mouse button, a gesture can express a command and indicate its target. Thus a "hot point" or focus must be defined for each gesture that the computer can recognize. This hot point should bear some logical relationship to the gesture being made. For example, a caret gesture is used to insert new text or documents, and its hot point is the tip of the caret. Some gestures are actually letters. An example of this is in text editing: printing a capital "U" over a word causes that word to be underlined.

Figure 4:
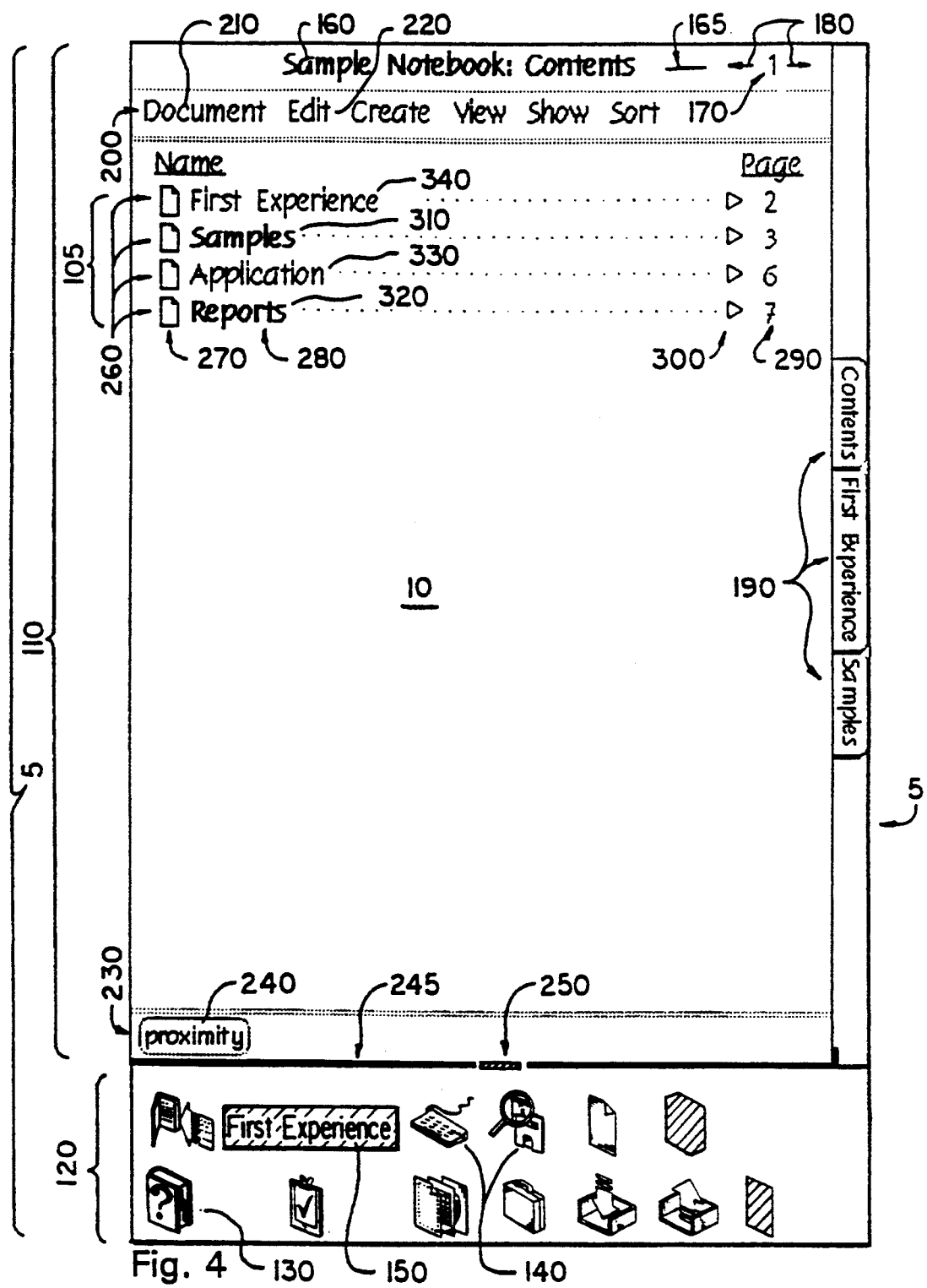
FIG. 4 shows the table of contents document.

FIG. 4 shows a typical initial display of the notebook computer 2. Almost every visible object on the display is responsive to some gesture. The upper portion of the display shows the "table of contents" display 105 of the main notebook 110. The lower portion 120 of the display 10 is a "bookshelf" of icons which represent other notebooks 130, various accessories 140, or "goto" buttons 150 linked to locations within documents in any notebook. Tapping a notebook or accessory icon 130 or 140 on the bookshelf will open its window, while tapping a link button 150 will cause the linked page to be turned to.

Features such as the page title bar 160, page number 170, page turn buttons 180, and visible page tabs or bookmarks 190 are common features of all pages presented in the notebook metaphor of the present invention. The menu bar 200 occurs on many pages in the notebook and includes one or more buttons. Typically, the activation of these buttons displays submenus of related commands or options.

The "Document" menu 210 and "Edit" menu 220 are available in all documents, and an optional "cork margin" 230 may appear at the bottom of the page. The cork margin 230 is essentially a private bookshelf for each document and may contain embedded documents, accessories or link buttons 240.

The lower edge 245 of the main notebook 110 can be dragged up or down to reveal more or less of the bookshelf 120. The resizing is done by holding the stylus tip 6 down on the center handle 250 of the lower edge 245, and dragging the bottom edge vertically.

Figure 5:
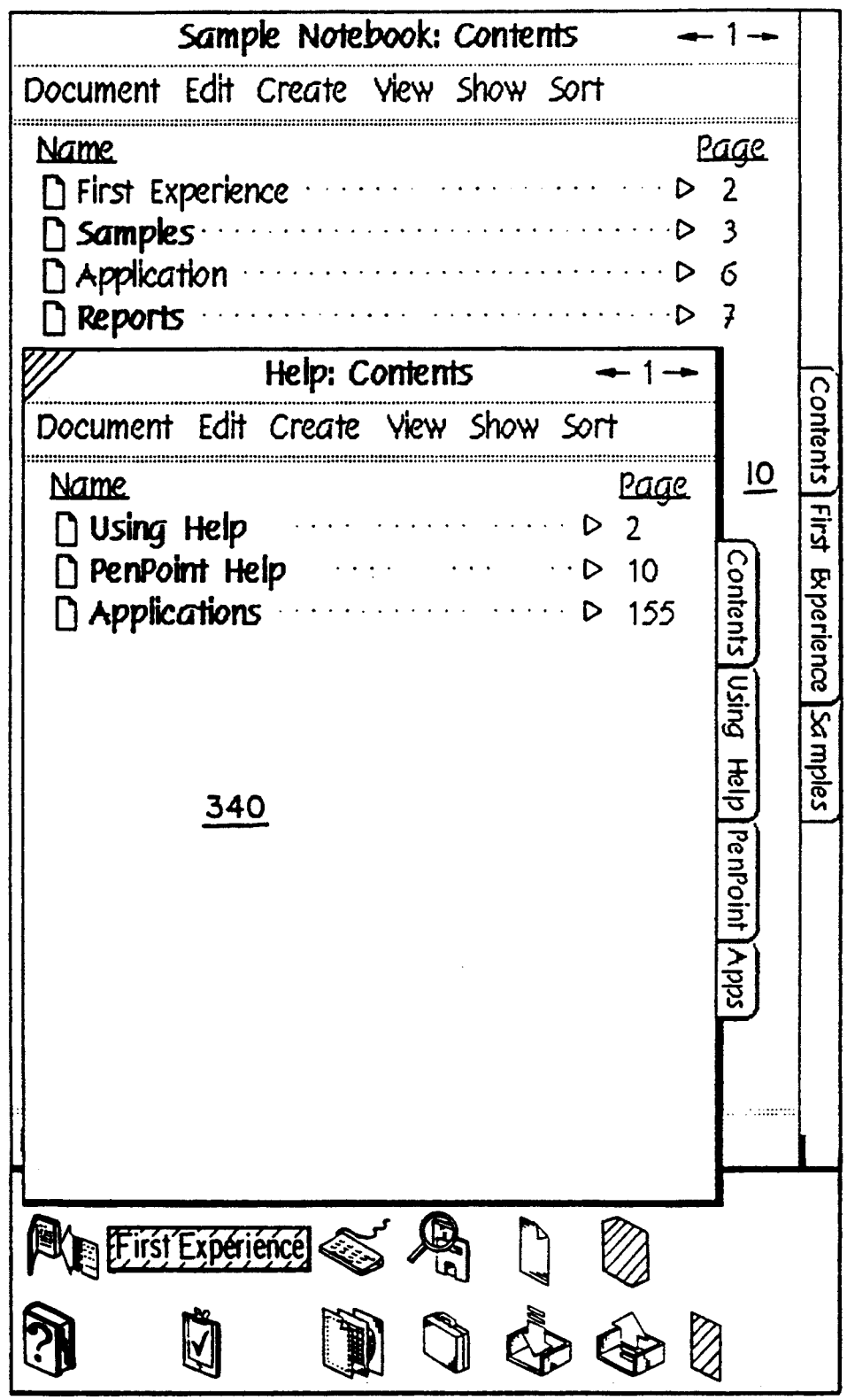
FIG. 5 shows a floating notebook.

Some specialized documents such as "Help Information" are best presented as notebooks separated from the main notebook. For example, such a format allows the "Help" notebook 340 (shown in FIG. 5) to be referenced as it floats above a user's document. Such independent notebooks support all of the features of the main notebook described above. A user might also organize different sets of documents into separate notebooks.

As shown for the notebook 110 in FIG. 4, the table of contents 105 on the "Contents" page of a notebook contains entries 260 for all top-level documents contained within that notebook. Each entry includes an icon 270, a title 280, a page number 290 and a page access button 300. The contents page (here, page 1) is itself the topmost instance of a document of type "Section". The entries (such as entries 310 and 320) of the table of contents 105 whose titles are bolded (Samples, Reports, etc.) are also "Section" documents which list the contents of subsections of the notebook 110. The entries whose titles are in a font of normal weight (such as entries 330 and 340) represent documents of other types.

An option for an expanded view can be selected from the "View" menu 350, as shown in FIG. 6. In this format, the nested contents 360 and 370 of each section (entries 310 and 320, respectively) will be displayed. Double-tapping on a section name (such as 310 or 320) will expand or close that section, depending on its state at the time of tapping.

As a typical page, the table of contents 105 demonstrates the pervasive use of gestures in control of the computer. FIG. 45 illustrates a wide variety of the gestures which are used in conjunction with the present invention. For example, a gesture 165 comprising a horizontal stroke or flick of the stylus in the title bar 160 (see FIG. 4) turns to another page. Flicking from right to left will turn to the next page, while a left-to-right flick will turn to the previous page.

The gestures shown in FIG. 45 represent idealized shapes for the gestures used in conjunction with the present invention. The user of the computer 2 should make gestures which approximate the idealized gestures as closely as possible, but of course exact duplication is not required. A user's actual gestures are more likely to look like those shown in FIGS. 46–48.

When the user actually makes one of the gestures on the screen, an image of the actual strokes made by the tip of the stylus appears on screen. The computer then recognizes the gesture by comparing it with a set of predefined gesture shapes. Then, the computer takes an action in response to the recognized gesture. In a preferred embodiment, after the actual strokes appear on screen and either before or while the computer takes the consequent action, a stylized or idealized form of the gesture, such as the forms which are shown in FIG. 45, appears on the screen in place of the user's actual gesture. This accomplishes two things: it gives the user feedback that assures him that the computer has recognized the gesture which was intended (or, alternatively, lets the user know that an incorrect gesture was recognized); and it consequently trains the user to make gestures which will more consistently be correctly recognized by the computer. If an unrecognizable gesture is made, the computer responds with an appropriate symbol, such as a question mark in a circle.

It may also be that a gesture is made which is out of context. For instance, a context may be created for a gesture to be made over a word. If that gesture is made over a word, then the location of the gesture is considered to be the word underlying the gesture. If the gesture is made but not over a word, an error is returned.

The proximity sensing for the termination of gestures in the present invention allows for very smooth and natural computer control. In general, the user will bring the tip 6 of the stylus 4 towards the screen 10 (which may be covered by a protective glass or plastic layer 12, as shown in FIGS. 1 and 2), and upon contact with the layer 12, a gesture may be drawn.

When the user is finished drawing the gesture, the stylus tip 6 is simply removed from the layer 12, and the system automatically detects this motion. At that point, the computer 2 immediately begins to process the command represented by the gesture. Thus, the user is not required to take any action other than actually drawing the command gesture (such as tapping an "execute command" button), and also is not required to wait any additional time (such as due to a time-out) for execution of the command, once the gesture is completed.

The distance at which proximity is sensed may be preset in software by setting a strength level for the signal when the tip 6 is nearby. Generally, this will not be adjusted once it is set. The calibration is for a given strength of signal, which occurs at, e.g., ¼ inch or other appropriate distance.

Many of the actions of gestural commands can also be triggered by tapping on buttons or menu items. Page turns are an example of this. The page can be turned by flicking within the title bar, as discussed above, or by pressing one of the page turn buttons 180. The two approaches are complementary: the gestural commands are quick and convenient, but provide no visual clues as to the availability and meaning of gestures in a particular region of the screen. Visible controls invite the user to explore the behavior of the computer but require extra operations to actuate an operation.

Figure 13:
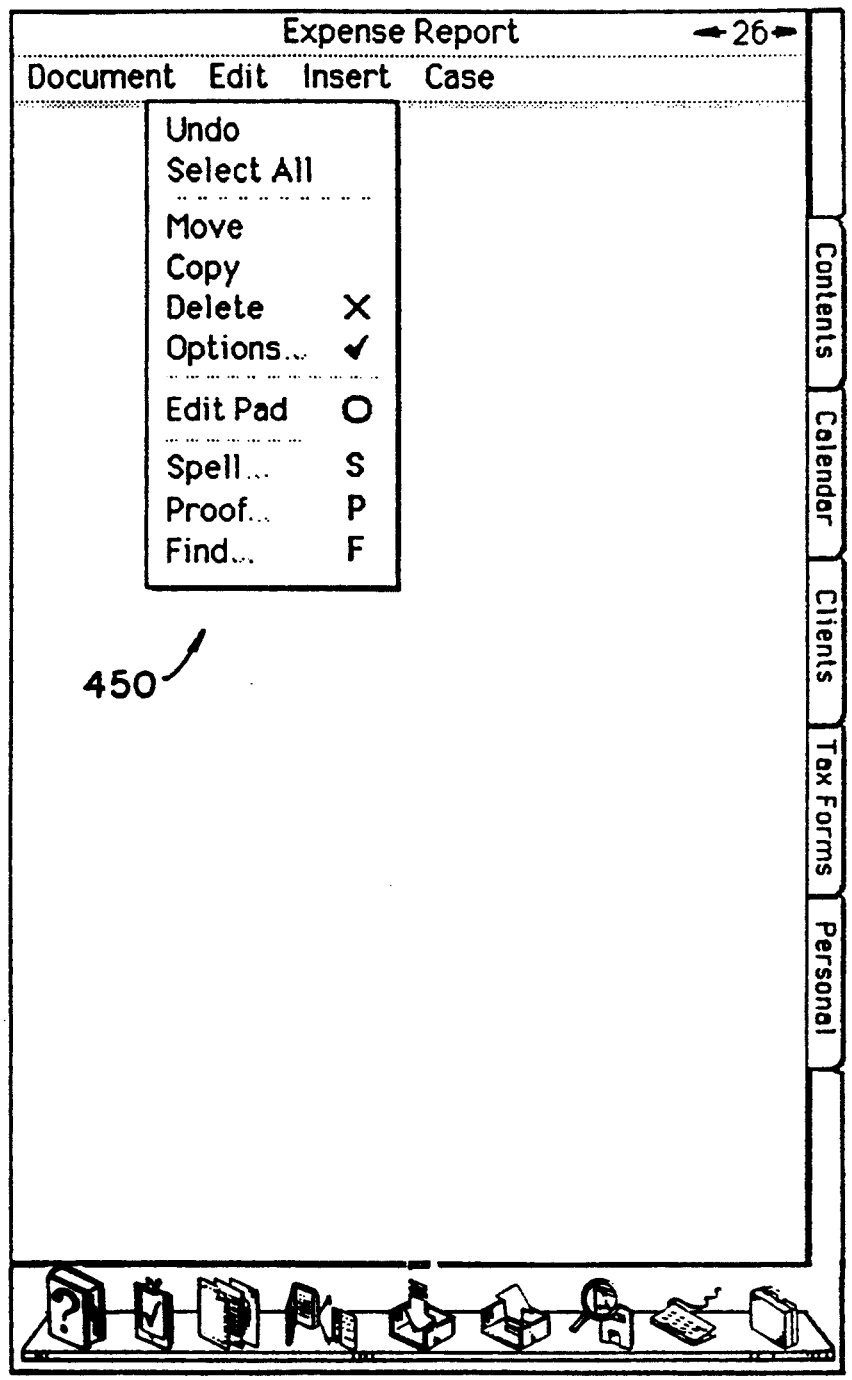
FIG. 13 shows a menu augmented with gesture symbols.
Figure 14:
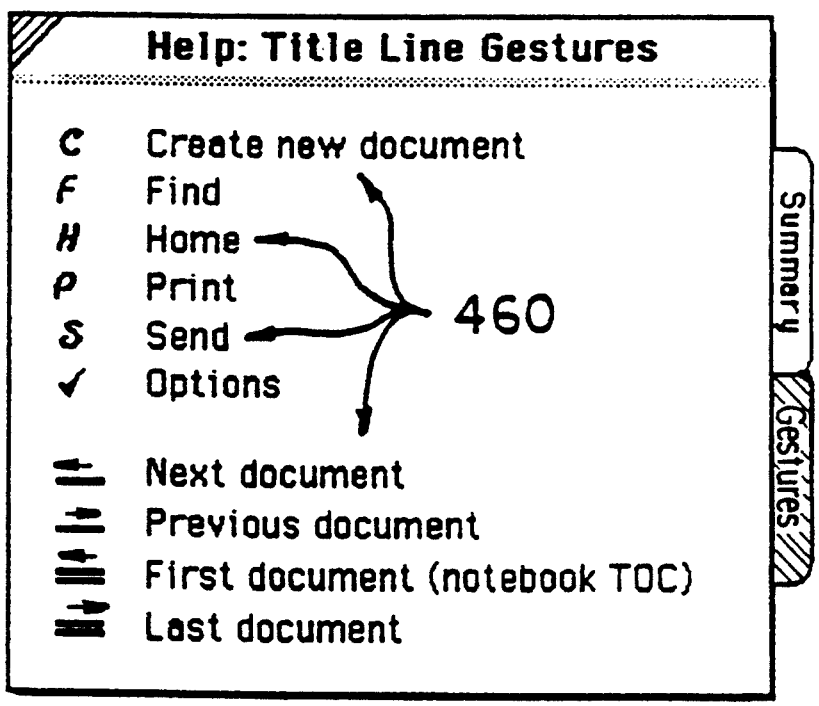
FIG. 14 shows quick gesture help.
Figure 36:
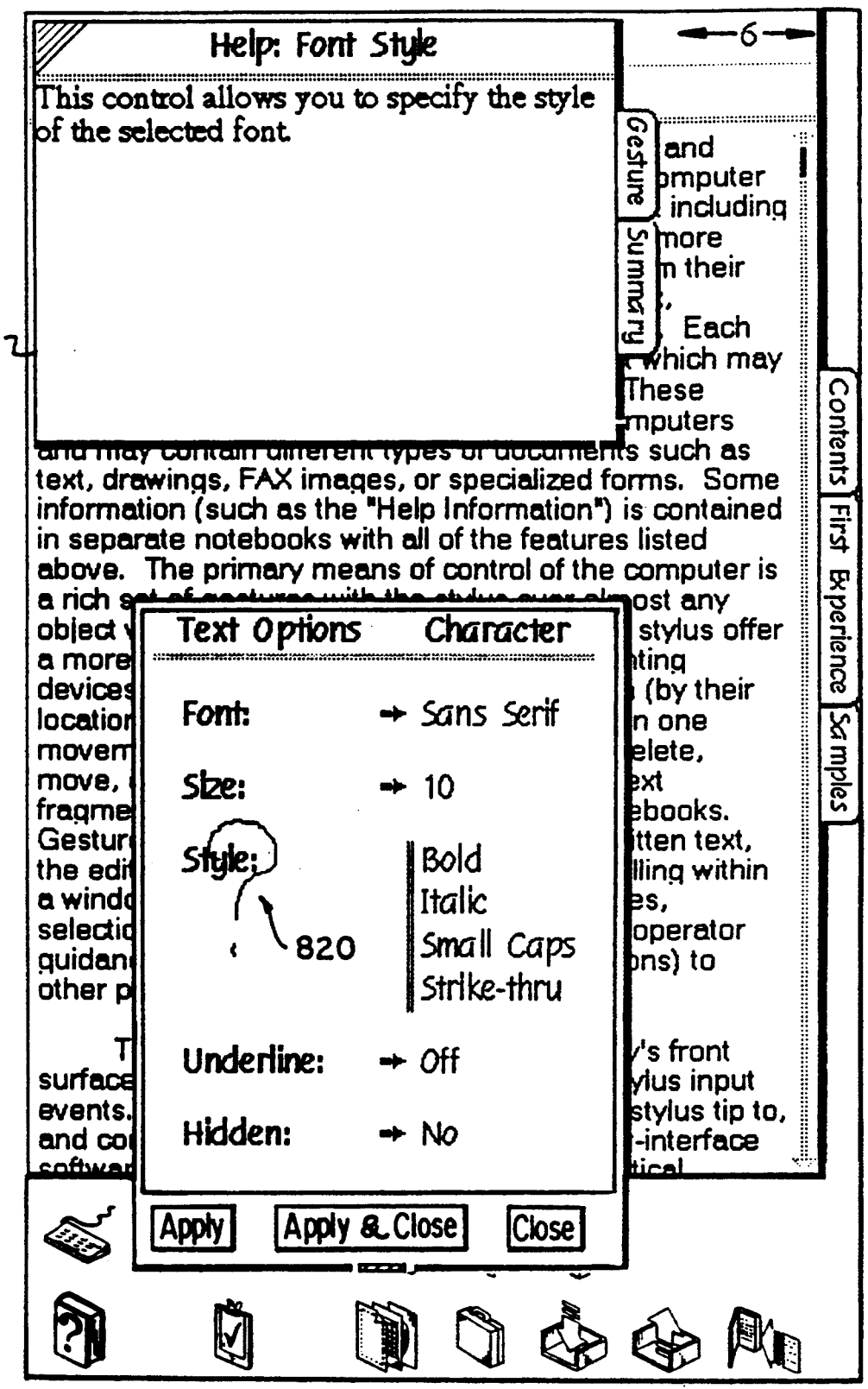
FIG. 36 shows a 'quick help' gesture and the quick help notebook.

The user can learn what gestures are acceptable for different procedures in two ways. First, menu entries that have gestural equivalents can be marked with a symbol that indicates the correct gesture, as in the gesture menu 450 shown in FIG. 13. In addition, explanations 460 summoned by the question-mark gesture 820 (see FIG. 36) contain the symbols and names of applicable gestures. Examples of instances where the computer supports a dual path to a given command are discussed below.

Figure 15:
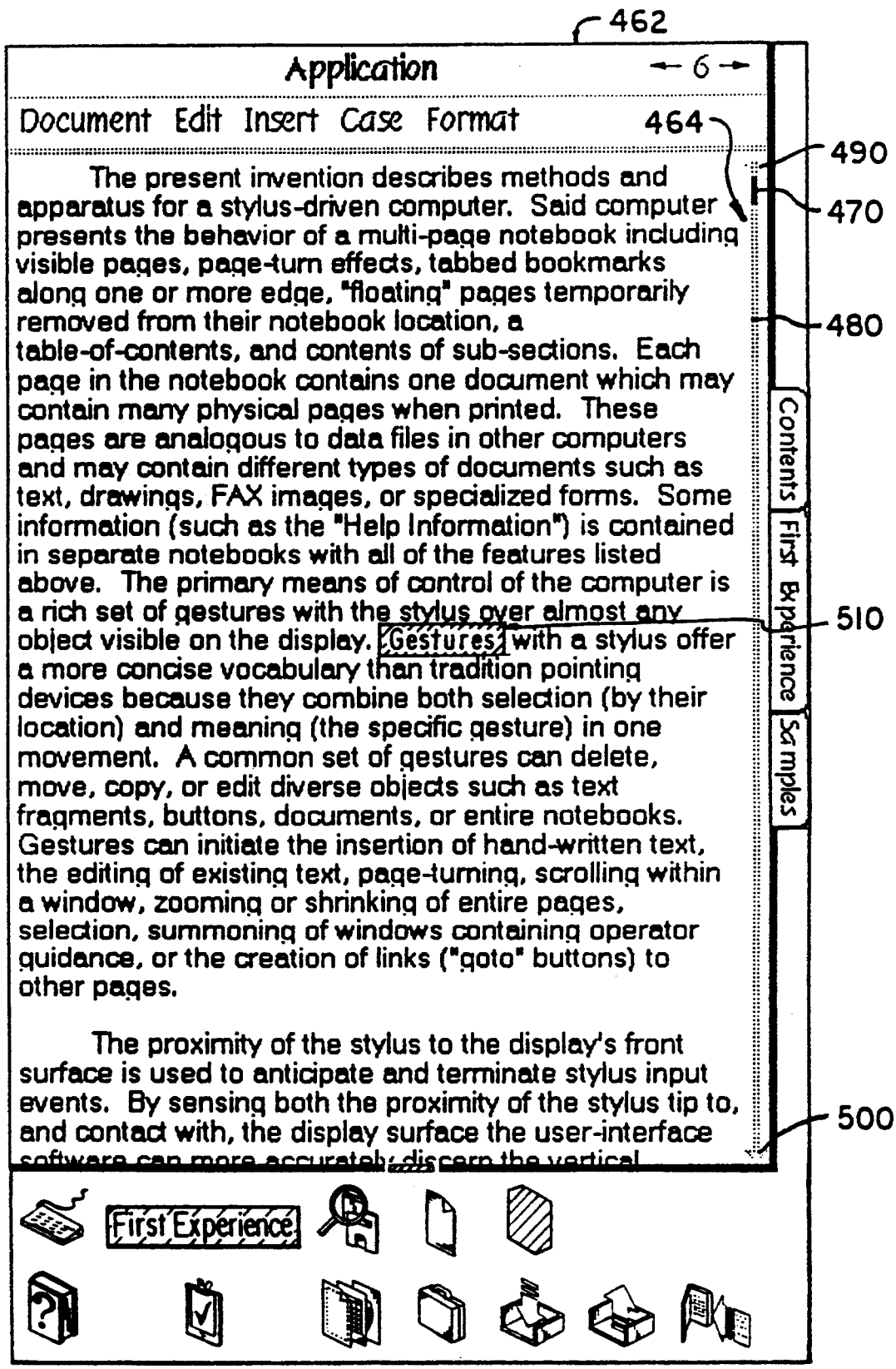
FIG. 15 shows a text document with a word selected.

By way of example, FIG. 15 shows a text document 462 with a scroll margin 464. Scroll margins and scrolling are used throughout the notebook when the information to be displayed cannot be shown in the space available. In the case shown in FIG. 15, the text of the document is too long to display in the area available. With scrolling, the display can be thought of as a window which is movable into some larger space. Documents can contain vertical and horizontal scroll margins in any combination.

In general, scroll margins such as scroll margin 464 include four elements: a slider 470, selection area 480, and the direction arrows 490 & 500. The slider 470 shows the position of the visible portion relative to the entire virtual position of the document 462 (much or most of which may be off screen).

Figure 16:
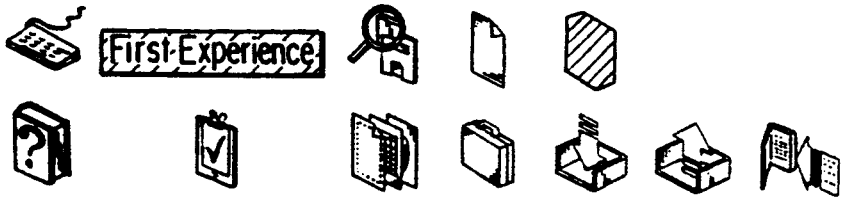
FIG. 16 shows the scrolling of a document with a scroll margin.

This visible region can be moved by various stylus gestures or by the direction arrows over the selection area, and thus accommodates more than one command approach. A tap on a direction button moves the view of the window into the document one line in that direction. Tapping within the selection area causes the region of the document which corresponds to the location of the tap to be displayed in the window. The slider 470 may be dragged up or down to cause the display of a region 520 of text corresponding to the position of the slider 470 in the selection area 480, as shown in FIG. 16.

As discussed below, there are many commands which may be entered either by the gestures or by other command means on the screen. Numerous gestures are detailed in the following discussion, most of which, in the preferred embodiment of the invention, are implemented using the departure-from-proximity detection to signal the completion of the respective commands.

The Use of the Gesture Commands

As mentioned above, a list of many available gestures for the present invention appears in FIG. 45. These gestures are described in detail in the course of the following discussion, with examples of how to use each being shown in the drawings.

Gestures have a strong advantage over visible controls. There may be, for a given computer action or command, both a gesture which can be drawn in a gesture area and a button or other command symbol which may be tapped to carry out the command. However, in the present invention, the gesture area which is sensitive to the command gesture is preferably much larger than the corresponding button or the like which may be tapped to accomplish the same command. This is due to the fact that a given region of the display can distinguish between many gestures and can display changeable information, while a button must be labeled in some static way and can only accept a tap.

Thus, in the case of scrolling, it is much easier to flick within a large window than to tap a relatively small button. This is also true of page turning, by flicking in the title bar vis-a-vis tapping on the page-turn buttons. Such ease of targeting is very important when using a notepad computer while standing, a common mode of use for such a portable computer.

A standardized, uniform procedure and set of gestures are used throughout the computer's user interface (i.e. across a plurality of applications) for selecting, moving, copying, deleting, editing, or setting the attributes of objects. Typical objects that can be manipulated are characters, words, spreadsheet cells, paragraphs, drawn geometric figures, icons, documents or entire subsections. To operate on an object, the object must first be selected and a gestural command issued. For example, a paragraph could be selected and then moved to another location.

In cases where the selection can be inferred from the target of the gesture, the selection step can be bypassed. Thus, the selection within a document may be a letter, word, sentence, or paragraph, while in the table of contents the selection is a document. If a selection has already been made and the gesture is made over the entire selection or a substantial portion of it, then the command applies to the entire selection. Otherwise, the selection is ignored, and the target is only what lies under the gesture's hot point. The current selection is marked by a grey background, such as with the selected word 510 shown in FIG. 15.

Within a block of text, the typical default selection for a gesture is the underlying word. For the selection of other units of text, a number of gestures are supported. A double-tap 622 on text explicitly selects a word, a triple-tap 512 selects a sentence, and a quadruple-tap 514 selects a paragraph. In addition, a square 657 drawn around a block of text or a region within a document selects that block or region. (See FIG. 45 for illustrations of these gestures.)

Any portion of text can be selected by holding the stylus tip down at either end of the desired region, pausing for a moment (during which time the letter preferably highlights), and then wiping or dragging the tip to the other end of the portion to be selected.

A selection can be extended or reduced in either direction to any arbitrary position by drawing a left or right bracket before, after, or within the current selection, respectively. Thus, insertion of right bracket 530 in FIG. 17 (see also FIG. 45) extends the selected word 510 to a selected portion 540, as shown in FIG. 18.

Figure 17:
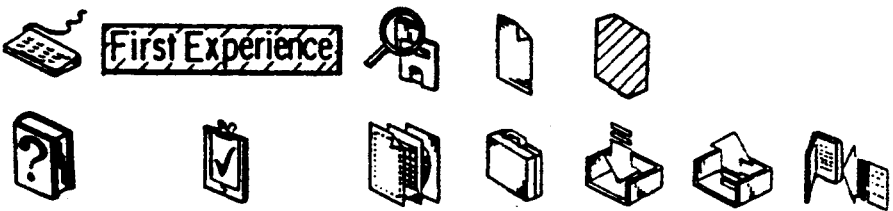
FIG. 17 shows the "extend selection" gesture.
Figure 18:
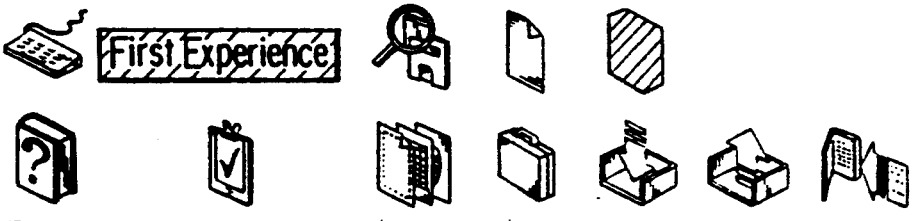
FIG. 18 shows the extended selection.

A right bracket 530 could also be placed in the selected portion 540 shown in FIG. 18, directly to the right of the word "Gestures", in which case the selected portion 540 would be re-sized to include only the word "Gestures", as originally shown in FIG. 17. Similarly, a left bracket 535 (shown in FIG. 45) may be used to extend the selected words or portion of a document to the left.

A basic gesture is the single tap 621 which, when made on tab 190 shown in FIG. 4, will turn to the page whose number appears on the tab.

Two taps in quick succession, i.e. a double-tap 622 on a tab (or on a page number 290 or page access button 300) will cause the corresponding page (such as page 380) to appear floating above the current page 10, as shown in FIG. 7 (i.e. in several applications within the notebook). Multiple pages may be floated atop one another. The turn-to and bring-to meanings for tapping and double-tapping, respectively, are used in many places throughout the notebook. The document buttons in a section document, the tabs, the page numbers in the index document and the "goto" link buttons all support this behavior.

A floating page can be sent back to its home location by tapping the triangular button 390 located at its upper left corner. Floating pages can be expanded to the full size of the display as in FIG. 8 by an upward flick of the stylus tip 6 on the title bar 440, and can be reduced to their original floating size by a downward flick on the title bar of the full-size page.

In addition, floating pages can be resized through the "handles" 400 and 410 at the lower right and bottom of their frames. To aid in targeting, these resize handles are previewed or highlighted when the stylus is brought into proximity with the position of the handle 400 or 410 on the display 10, resulting, for example, in highlighted handle 430 (see FIG. 10) when the stylus tip 6 is nearby.

Once the highlighted handle 430 appears, the boundary of the floating page can then be shrunk or stretched by touching the stylus tip to the highlighted handle 430, and dragging the tip 6 to the desired position, such as position 420 shown in FIGS. 9 and 10. In a similar fashion, the position of floating pages can be changed by holding the stylus tip down on the title bar 440 and dragging the pen tip to a new location 445, as shown in FIGS. 11 and 12. Floating objects maintain their positions as the underlying page (such as page 1) is turned.

Figure 37:
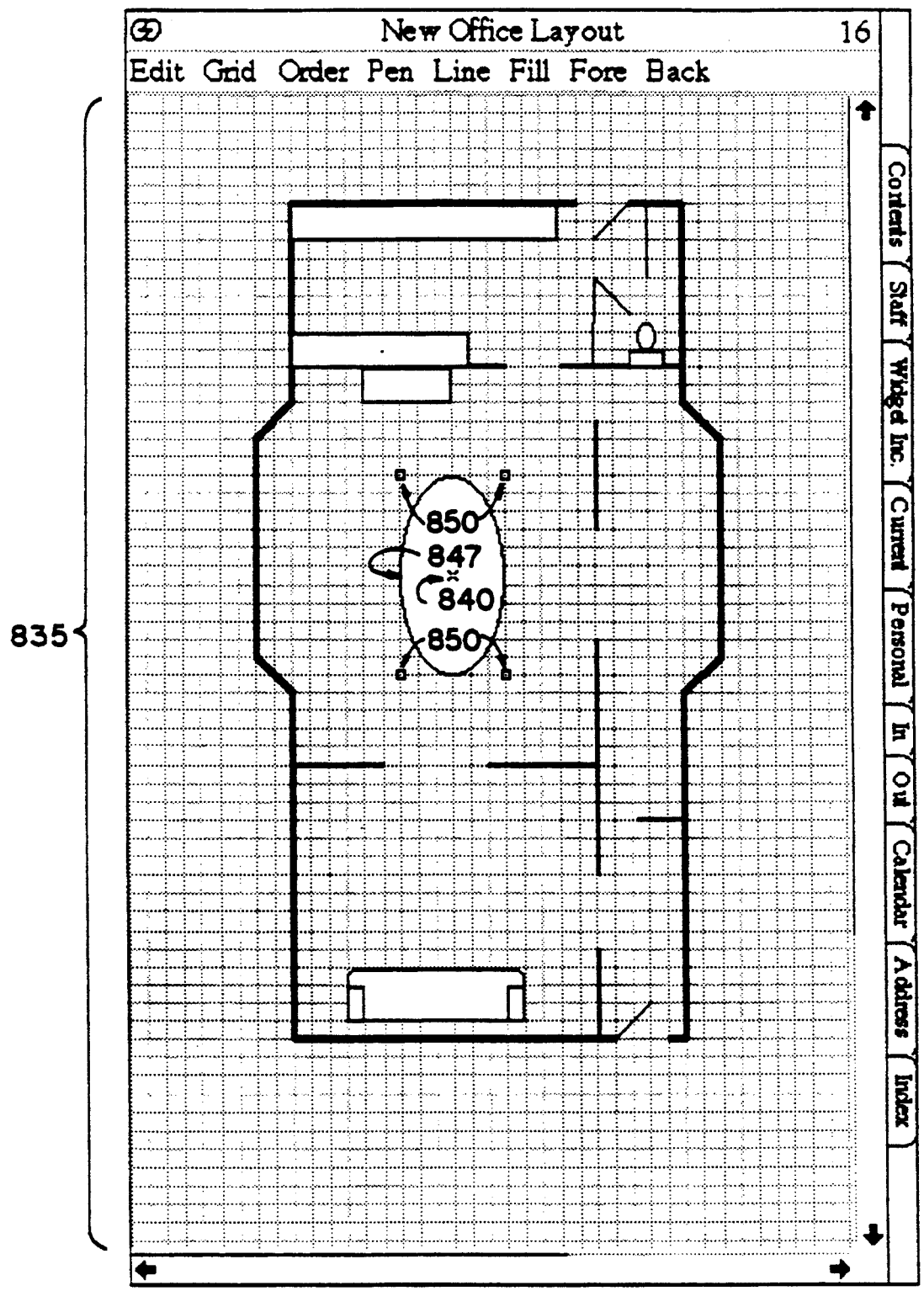
FIG. 37 shows a "Drawing Paper" document with a selected object.
Figure 38:
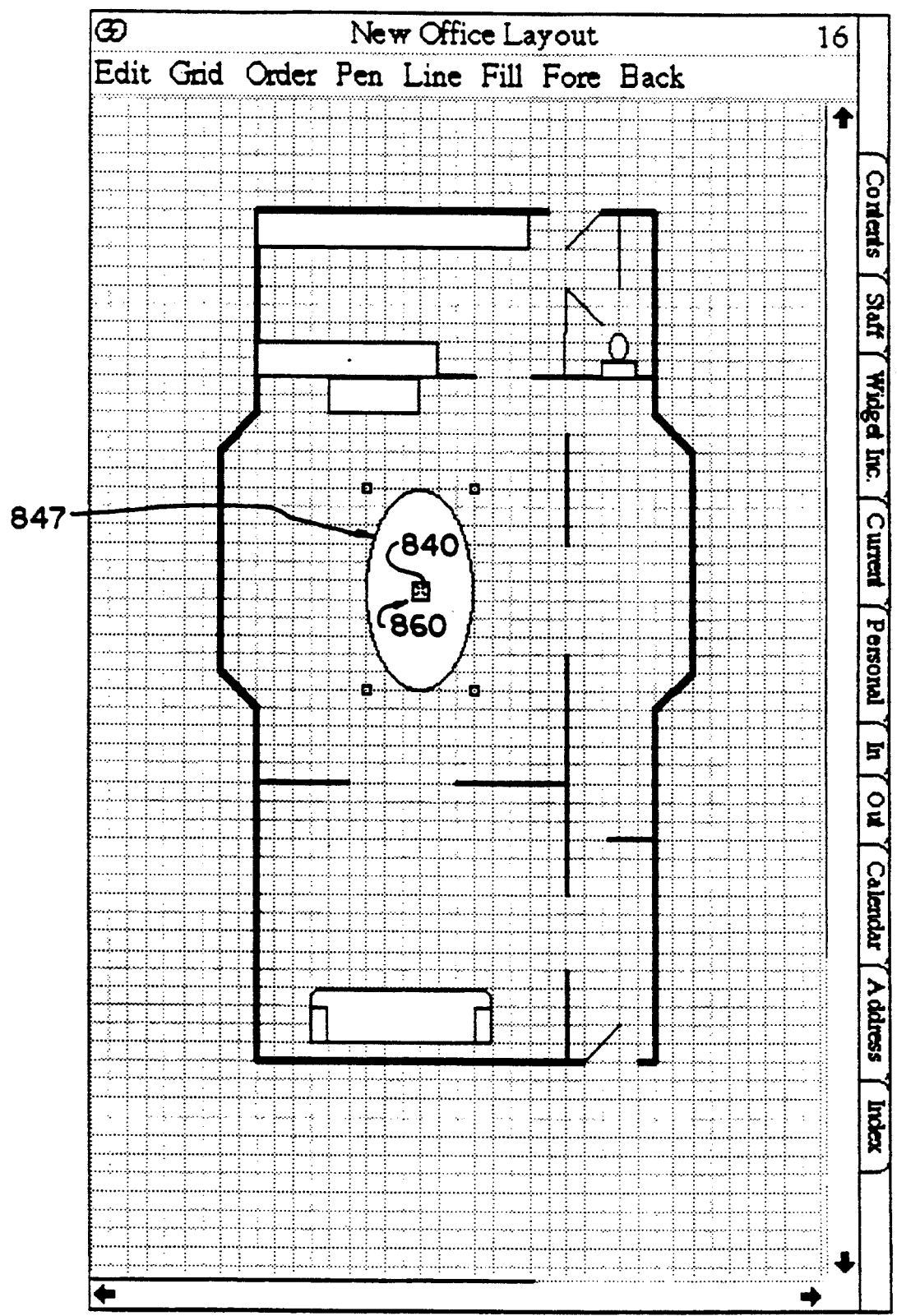
FIG. 38 shows a targeted handle on an object.
Figure 44:
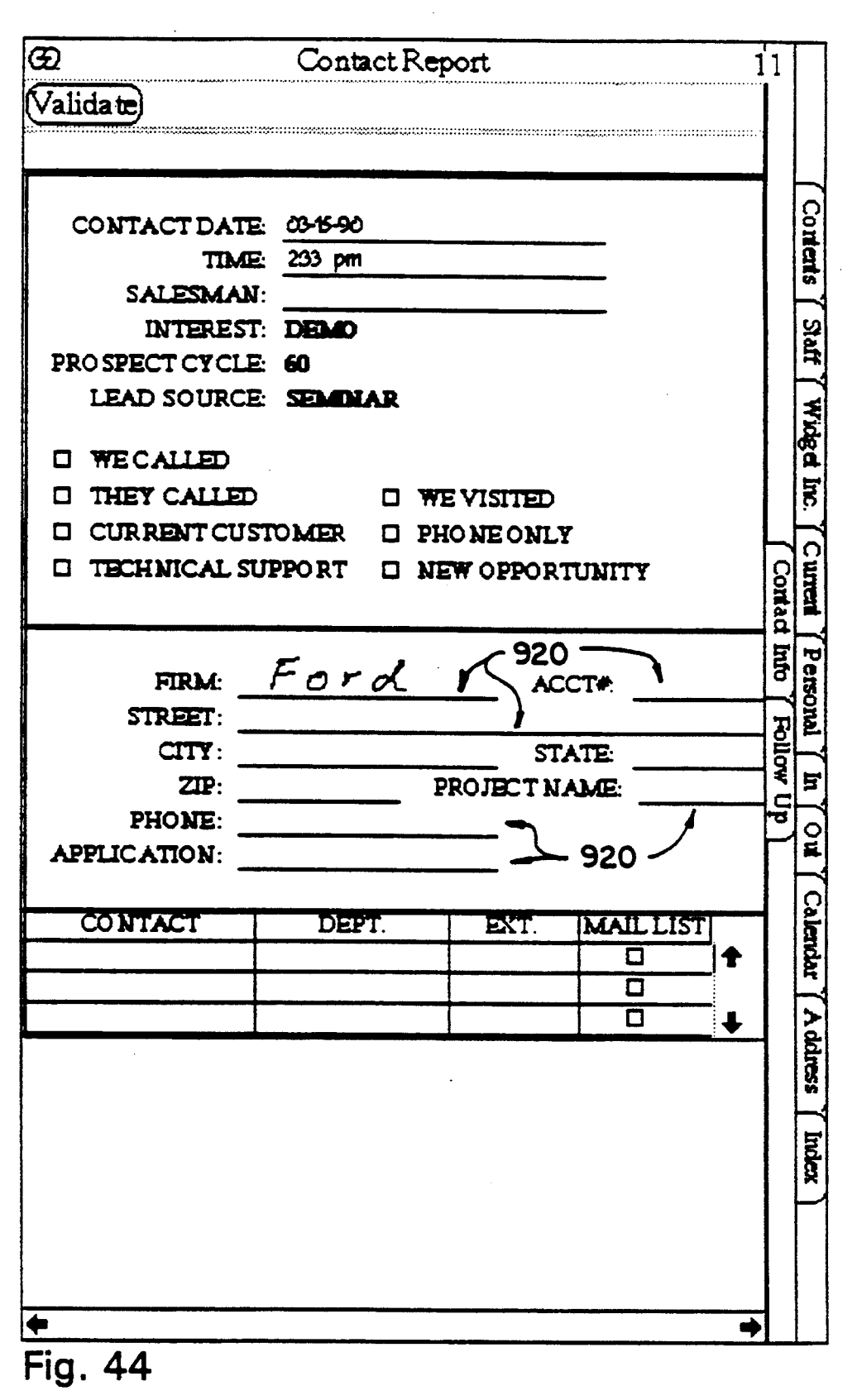

An upward flick 623 (see FIG. 45) "pushes up" the visible portion of the document while a downward flick "pulls down." Left and right flicks within a horizontal scroll margin have an analogous effect, as shown in FIGS. 37 and 44. These gestural commands may be used as alternatives to the use of the scroll margin discussed above.

Two flicks in the same direction in quick succession may be referred to as a double flick, which make up gesture 624 shown in FIG. 45. A double flick moves the document to its extreme in that direction. Triple flick 625 and quadruple flick 626 provide extensions of this action for documents structured in a more hierarchical fashion. For example, in a numerical spreadsheet, a single flick could move the distance of one line, two flicks may move to the next window, three flicks can move to the next page, and four flicks may move to the extremes (e.g., top, bottom, and sides) of the spreadsheet. These positioning flicks can be drawn in the body of the document in cases where flicking does not conflict with other stylus actions recognized within the document body.

The deletion gesture 629 (shown in FIGS. 45 and 51) is a cross or 'x' drawn over the object the user wishes to delete. A word or a selected portion in a document is deleted by simply drawing an 'x' over it. Thus, in FIG. 51, the selected phrase "our line" is deleted simply by x-ing it out, with the result shown in FIG. 52.

Figure 53:

Within a section document, an entire listed document may be similarly deleted, simply by drawing the x gesture 629 over its name. This is shown in FIGS. 53 and 54, where the document "Calendar" is deleted by the use of this gesture.

Any visible tab can likewise be removed by drawing an 'x' over it, and a document can be deleted by an 'x' gesture in the document's title bar. The hot point of the 'x' gesture is center of the cross. The current selection may also be deleted by choosing the "Delete" entry 520 under the "Edit" menu 545 shown in FIG. 20.

Within a body of text, a "scratch-out" gesture 656 (see FIG. 45) can be used to delete many letters at once. The gesture is drawn as connected strokes, resembling a squashed or vertically compressed "z". The top stroke is drawn left to right, then the middle stroke is drawn from right to left, and the bottom stroke is drawn from left to right. The targeted letters are those which are bracketed by the extreme ends of the strokes and hence, the size and location of the gesture (in this case, the bracketing gesture) are both attributes affecting the target of the gesture.

Figure 21:
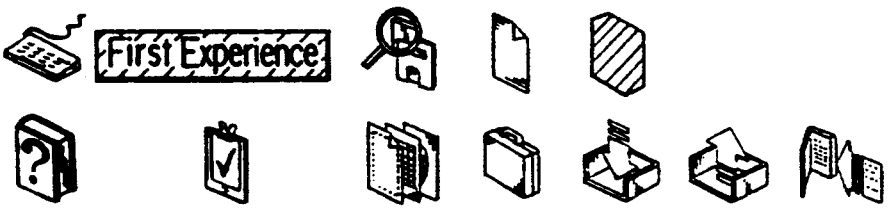
FIG. 21 shows the 'edit' gesture drawn over a word.
Figure 22:
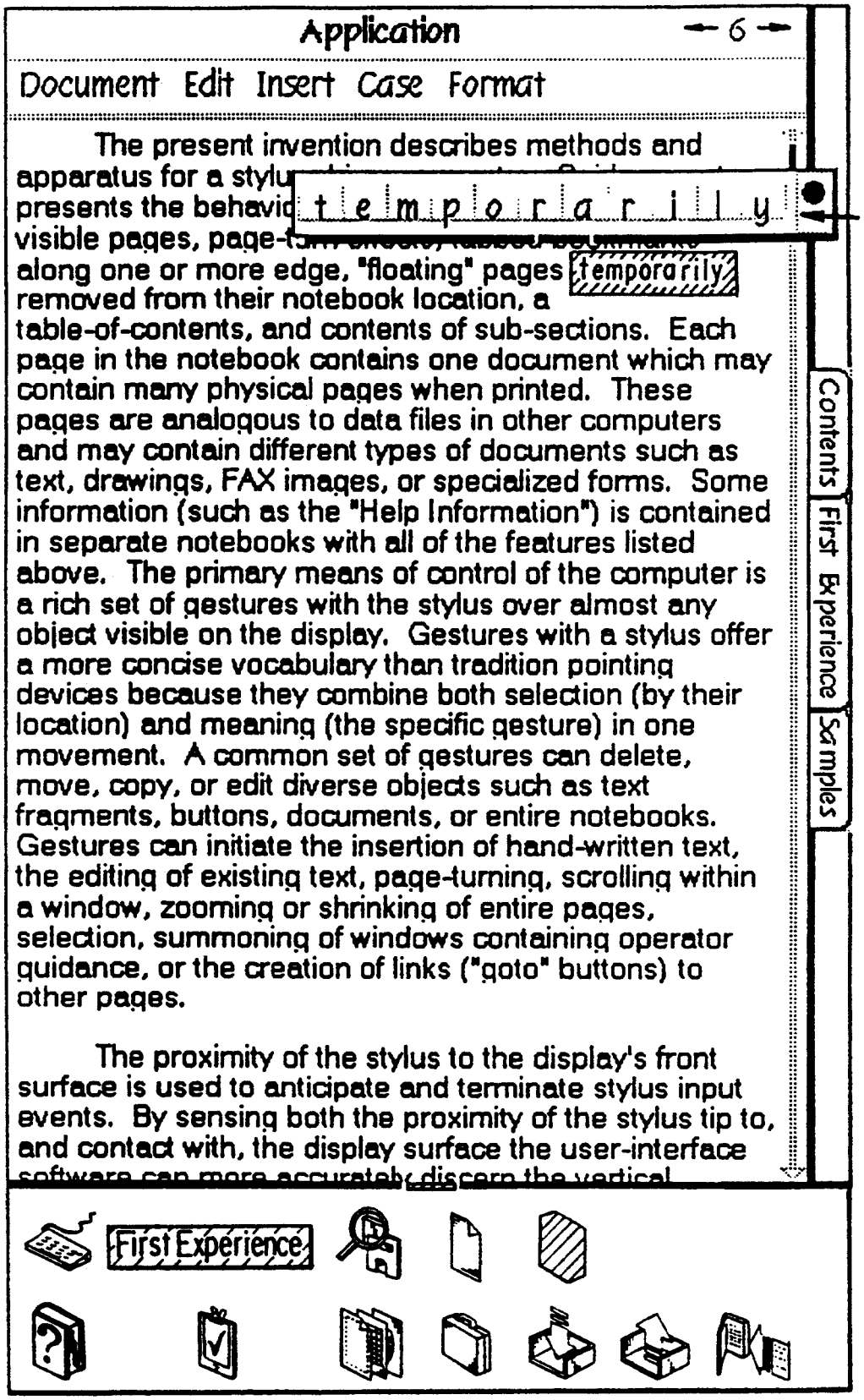
FIG. 22 shows a pop-up edit pad.

Any user-defined text can be edited by drawing a circle gesture 610 over it, as shown in FIGS. 21 and 45. This gestural command is effective on words within a document, the text in title bars of documents, the contents of tabs, the entries in a section document, the labels of link buttons, and other portions of documents or notebooks. In response to the gesture 610, a small window or editing pad 620 containing the selected text is displayed nearby, as shown in FIG. 22.

Corrections, deletions and additions can be made using the common editing gestures. The hot point of the circle gesture is its center. Within a text document, the current selection may also be edited by choosing the "Edit Pad" 590 from the "Edit" menu 547.

A given word can be replaced by a gesture similar to the circle gesture. A gesture 651 comprising a circle drawn with a horizontal stroke through it, shown in FIG. 45, will cause an empty editing pad to be displayed. After the user fills in the edit pad and closes it, the selected word will be replaced with the new word.

A special case of text editing is the "proof" gesture: a capital letter "P". When drawn over a word, this gesture summons an editing window 630 which lists similarly spelled words, as in FIG. 23. The existing word can be edited or replaced in its entirety by single-tapping on one of the listed alternatives. Within a text document, the current selection may also be proofed by choosing the "Proof" entry 600 from the "Edit" menu 547 shown in FIG. 20.

In general, as indicated in FIG. 45, the letters A-Z may all be used as command gestures, with the meaning of a particular letter depending upon the particular context or setting in which it is used.

A number of special gestures are used to allow common text editing operations. FIGS. 46-48 illustrate various such gestures in the context in which they are used, and also illustrate the actions taken by the computer as a result of these gestures. These figures complement the table of gestures shown in FIG. 45.

For example, in FIG. 46 a vertical "pigtail" 632 is shown, and is used to delete one character, such as the letter "y" in the word "catchy". The result 633 is shown on the next line of FIG. 46.

A down-and-right gesture 631 inserts a space between two characters, with the result being shown as 631A. An up-and-right gesture 634 is used to insert a single character between two existing characters. When this gesture is made, a floating, one-character edit pad 635 appears. After a single character is written into the pad 635 and the pen leaves proximity, the pad 635 closes, the computer proceeds with the recognition routine on the inserted character, and the recognized character is inserted into the body of text at the place where the gesture 635 was made, as shown at 635A.

A line-break in inserted by a down-and-left stroke followed by a left flick, as shown at 636 in FIG. 47. The result is shown at 637.

A paragraph break gesture 638 is made by a down-and-left stroke. The result is shown at 639 in FIG. 47.

A tab may be inserted by a gesture 640 including a down-and-right stroke combined with a horizontal flick, with the result being shown at 641 in FIG. 47.

Letters may be set to upper and lower case by using three gestures shown in FIG. 48. An up-and-right gesture 642 capitalizes the first letter of the target word and changes the rest of the word to lower case, as shown at 643. A right-and-down gesture 644 sets all the letters to lower case, as shown at 645. Finally, a gesture 646 including a right-and-up stroke followed by an upward flick capitalizes the whole word, as at 647 in FIG. 48.

Figure 24:
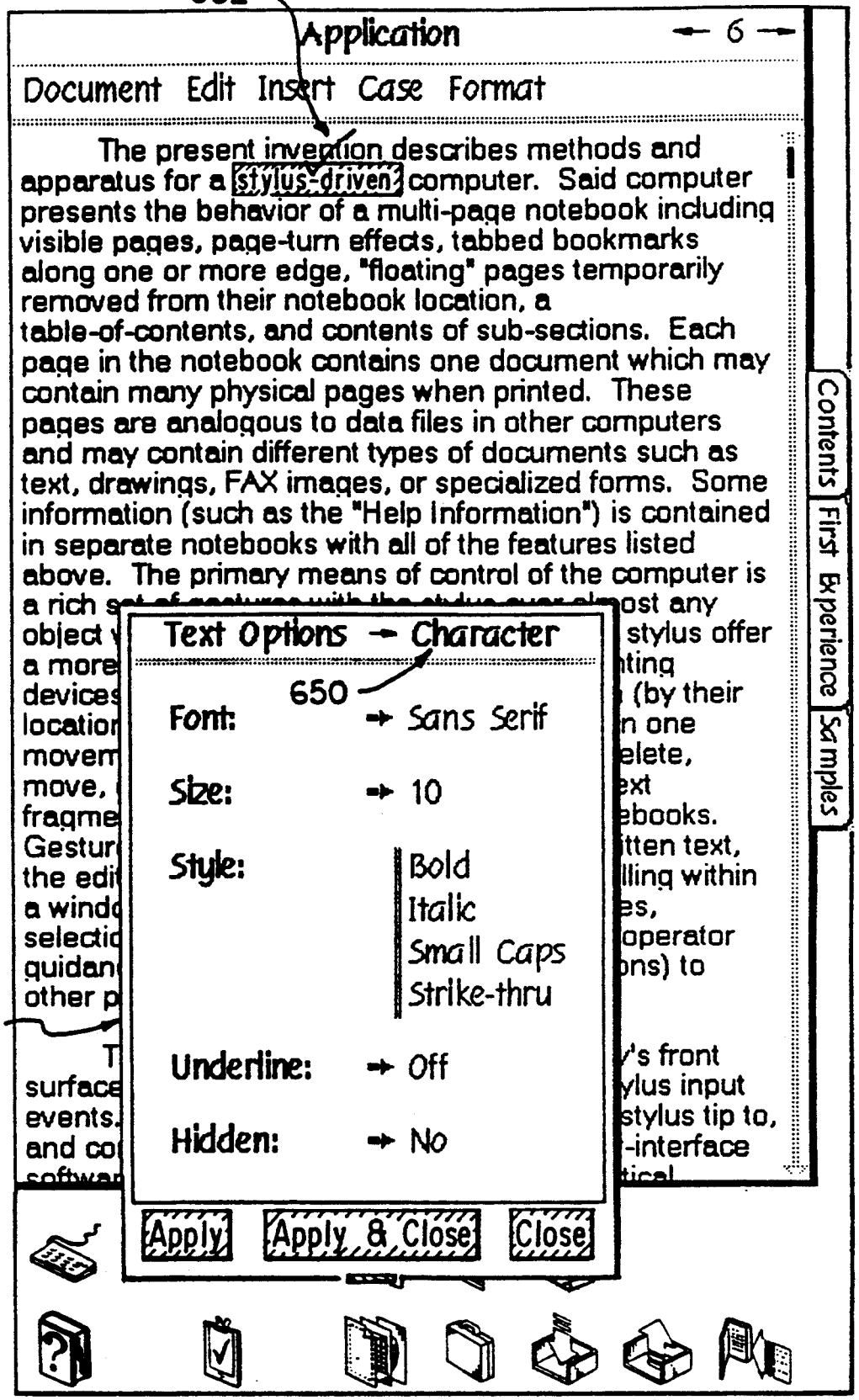
FIG. 24 shows a text formatting option sheet.

A check-mark gesture 652 (see FIGS. 24 and 45) is use to view and set the attributes of an object. In response to the gesture 652, a clipboard 648 of option sheets is displayed, as shown in FIG. 24. (For the sake of illustration, in FIG. 24 the highlighted text, the gesture, and the action—in this case, the display of the option sheet clipboard 648—are all shown together. However, in the preferred embodiment, the representation of the gesture, such as the check-mark 652, disappears when the action is taken, and therefore would not, in this case, continue to be displayed when the clipboard 648 comes up.)

Figure 66:
Figure 67:

Another illustration of the use of the check mark gesture 652 is shown in FIGS. 66–68. In FIG. 66, the check mark gesture 652 is drawn over the word "quick", causing the Text Options sheet 652A to appear. The user may then choose from the available text options, such as by tapping next to the word "Bold". Then, when "Apply & Close" is chosen, the selected word appears in bold type style, as shown in FIG. 68.

Figure 69:
Figure 71:
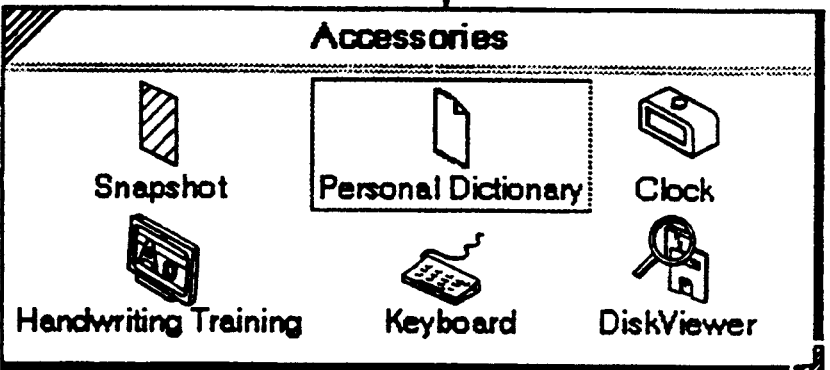
Figure 72:
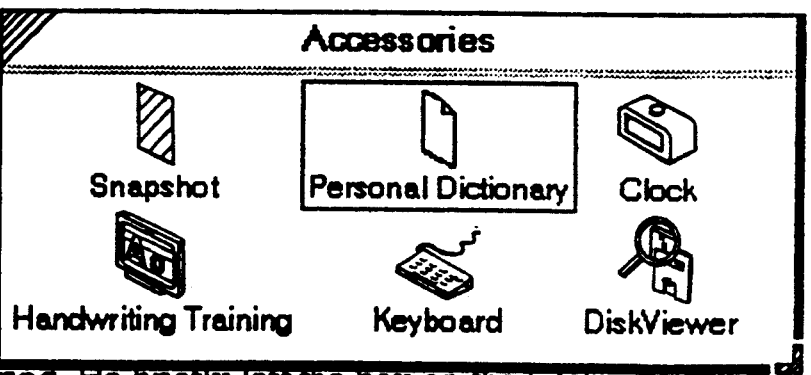

In FIG. 69, an "N" gesture 663 is shown over the bold-face word "quick". This is a shorthand alphabetic command to return the type style to "normal", as it originally appeared in FIG. 66.

Figure 25:
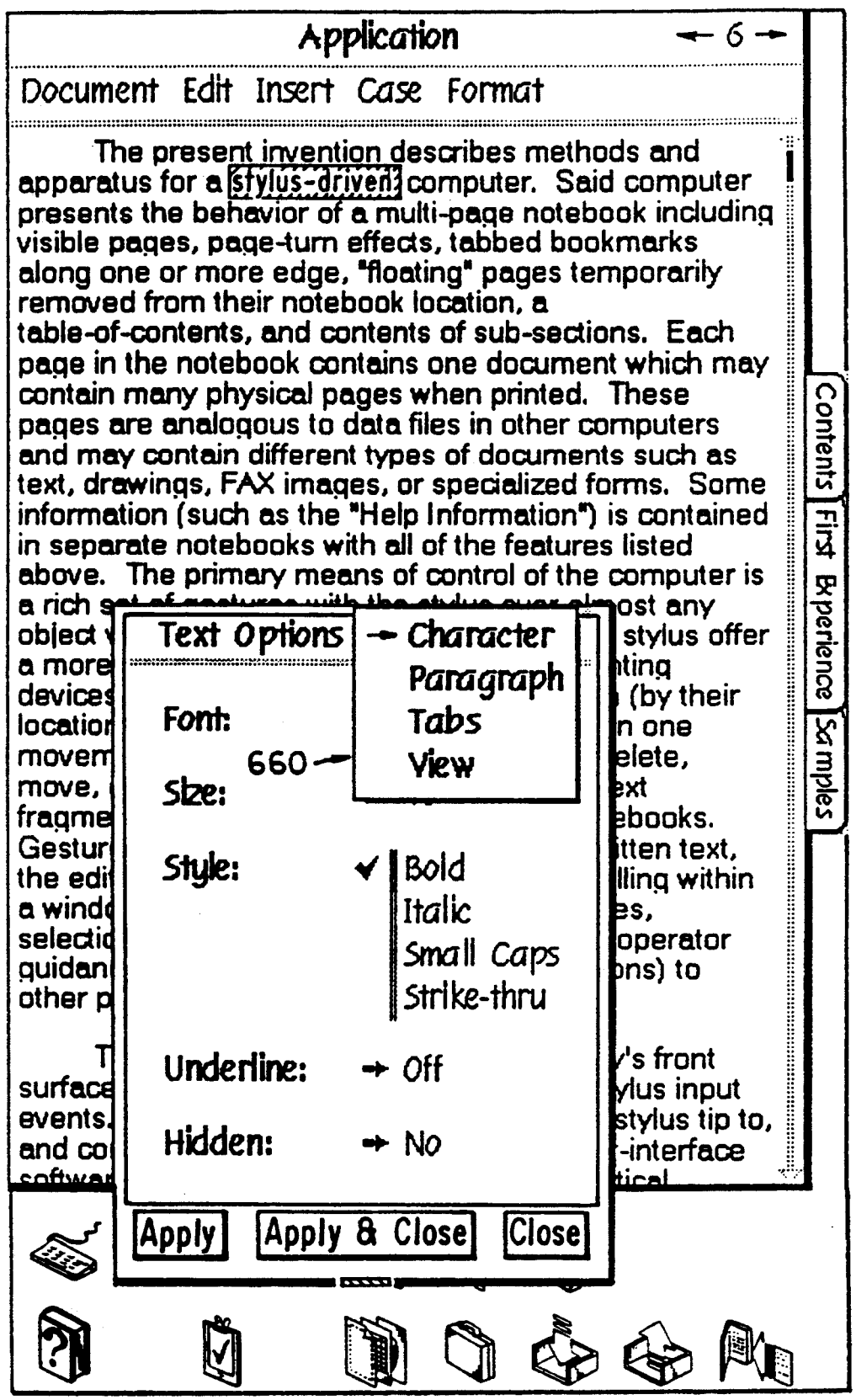
FIG. 25 shows the available text option cards.

If an object has more than one option sheet, then the other sheets are selected by tapping on the title of the current sheet (such as "Character sheet" 650) at the top of the clipboard and choosing the desired sheet from the resulting pop-up list 660 (shown in FIG. 25). For text, the option sheets control and display various visual attributes, such as font size and style, bolding, slant, and underlining.

As a quick alternative to calling up the options sheet 648, the appearance of text may be changed by specific gestures drawn directly over a selection or word. Text may be bolded, italicized, underlined or returned to an unadorned ("normal") state by the gestures "B", "I", "U", and "N", respectively. In addition, the font size can be increased by the up-arrow gesture 653, or decreased by the down-arrow gesture 654, both shown in FIG. 45. This is illustrated in FIG. 55, where the font size for the word "design", originally in normal size, is increased by the use of the up-arrow gesture 653.

Figure 20:
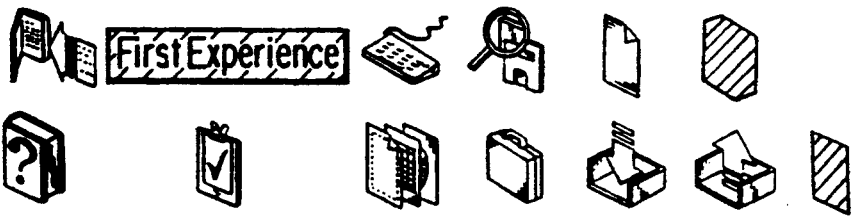
FIG. 20 shows the "Edit" menu.

The option sheets for objects within the body of a document can also be accessed by selecting the "Option . . ." entry 580 from the "Edit" menu 547 shown in FIG. 20.

Figure 26:
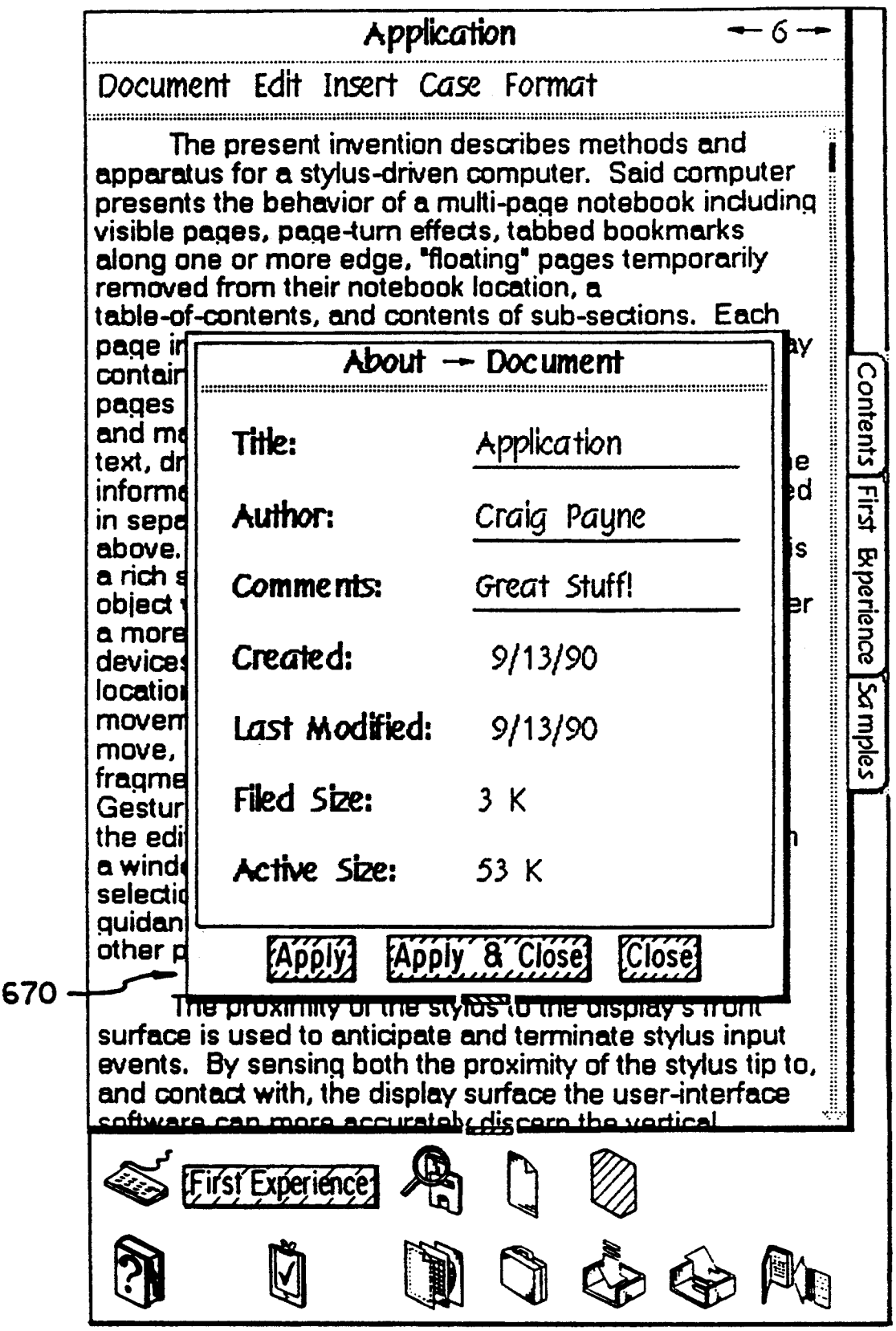
FIG. 26 shows a document information option card.
Figure 27:
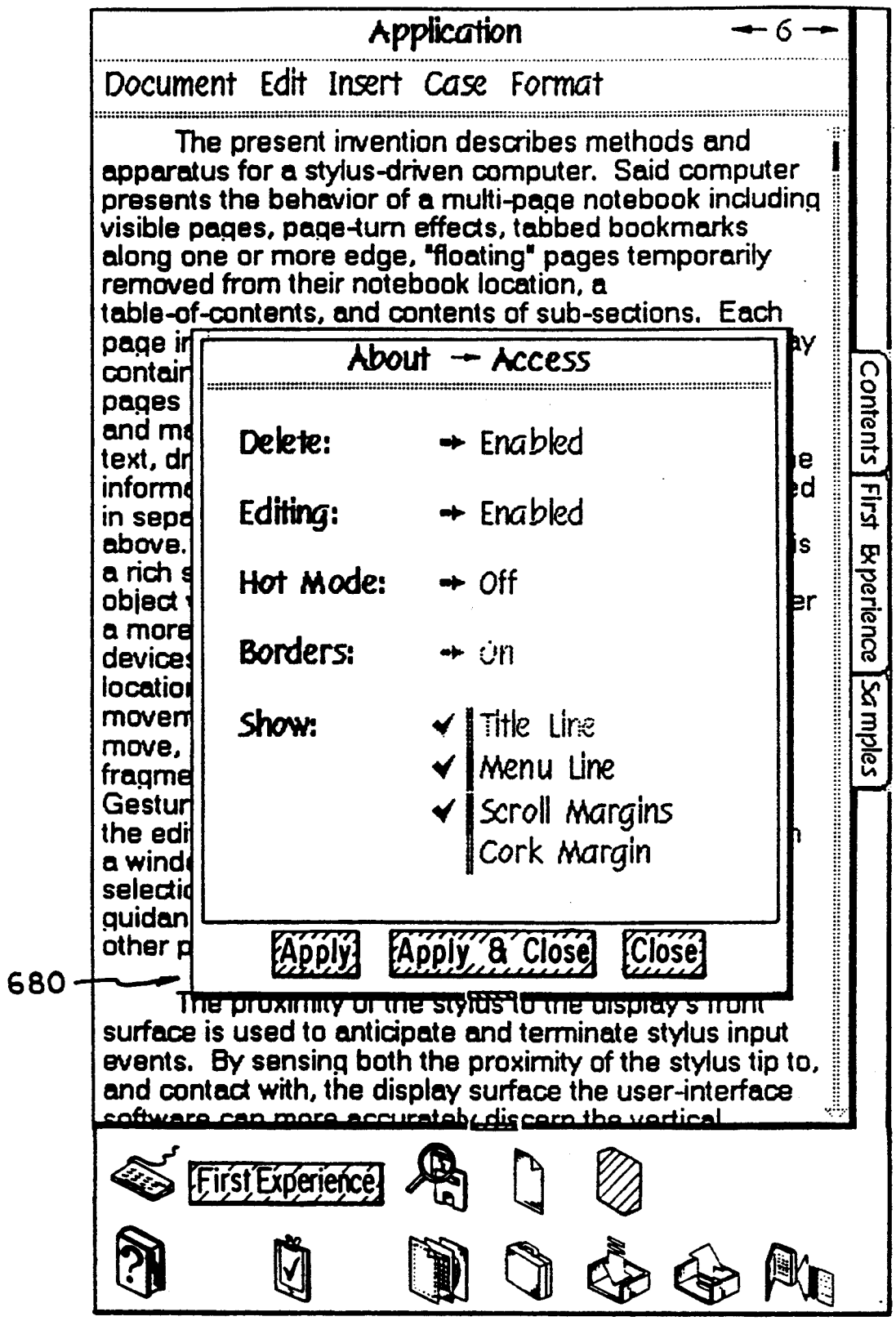
FIG. 27 shows a document access option card.

The option sheet of documents may be accessed by drawing a check-mark 652 (see FIG. 45) in the title bar. The "Document" sheet 670 shown in FIG. 26 displays such attributes as title, author, comments, size and access dates. The "Access" sheet 680, shown in FIG. 27, enables or disables the various controls that surround the body of a document.

Many of these controls can be toggled off or on by drawing a gesture in the title bar of the document. The "M", "C" and "B" gestures toggle (i.e., turn on and off) the menu, cork margin, and borders, respectively.

These options are generally used when embedding one document into another, to cause the embedded document to blend in with the surrounding main document. The option sheets for an entire document can also be accessed by selecting the "About . . ." entry 545 from the "Document" menu, as shown in FIG. 19.

Figure 28:
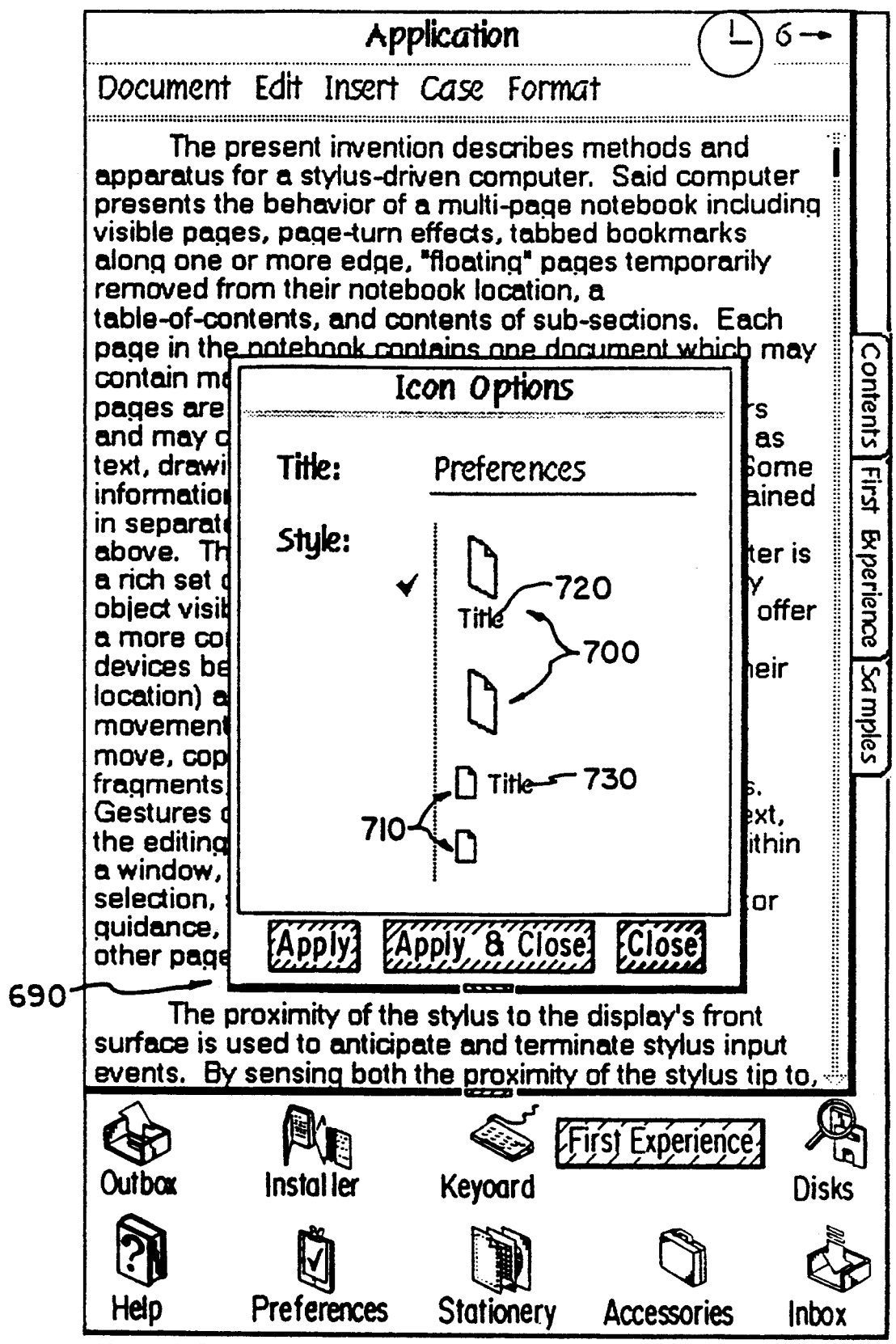
FIG. 28 shows an icon option card.

A check-mark 652 drawn over an icon displays an option sheet 690, shown in FIG. 28, which controls the appearance and labeling of all icons. Large icons 700 and small icons 710 are available with or without labels such as labels 720 and 730.

In some cases, an object offers no convenient place where a check gesture can be used to access its options sheet. An example of this occurs when one document is embedded within another. The borders of an embedded document can be turned off by using the "Access" option sheet or by drawing a "B" gesture in the title bar.

In such a case, there may be nowhere to draw the check gesture 652, which is needed to access the options sheet for the document as a whole. This is because a check 652 drawn in the body of a document applies to the contents (words, figures, etc.) of the document, and not to whole document.

Figure 49:
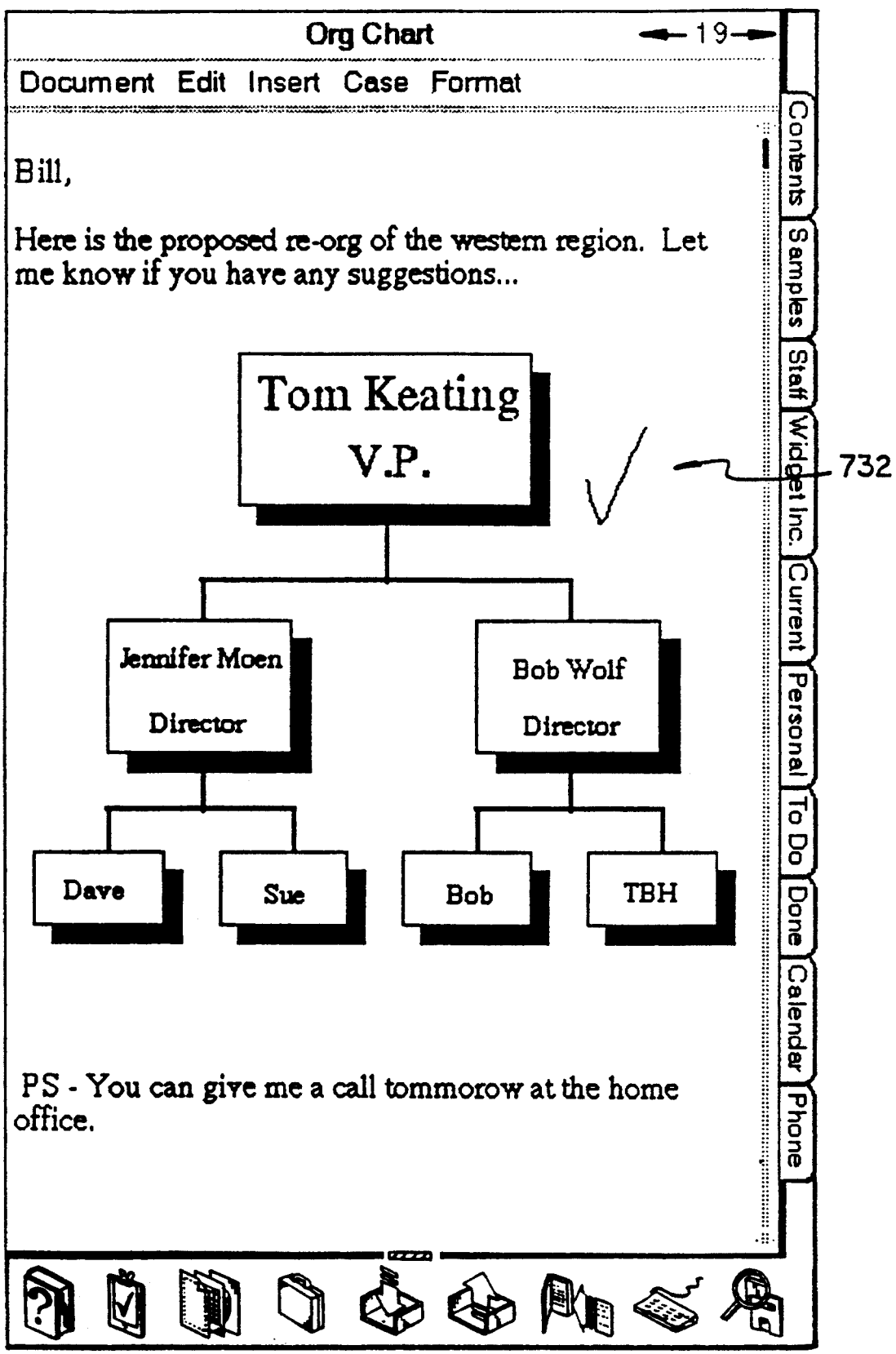
FIGS. 49 and 50 are screen shots showing the use of a check-tap gesture to call up an options sheet.
Figure 50:
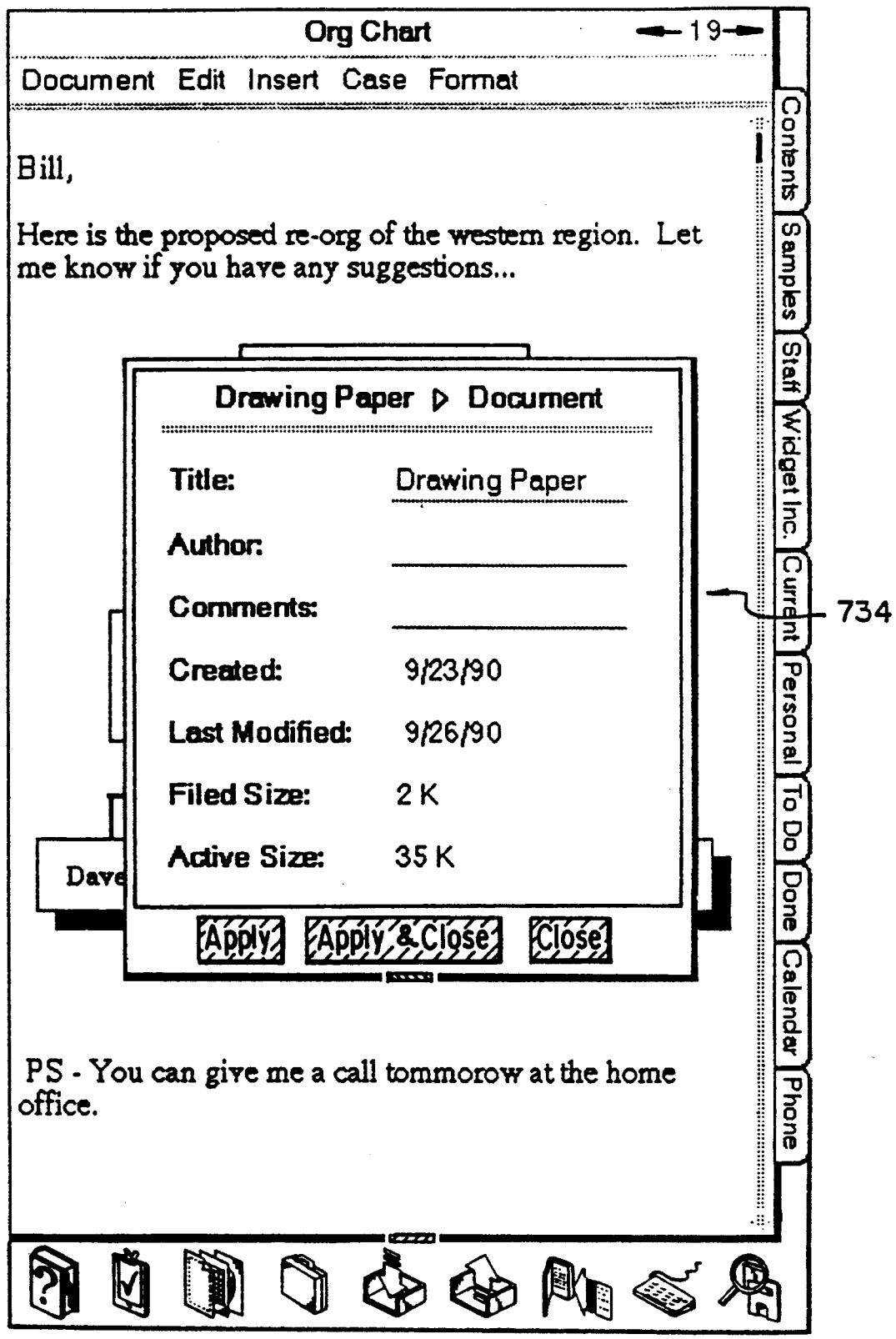

The solution to this in the present invention is to use a check-tap gesture 732 (shown in FIGS. 45 and 49), which accesses the options sheet of the container in which it is drawn-in this case, the drawing paper document which is embedded in the document "Org. Chart". FIG. 50 shows the result 734 of using the check-tap gesture 732 on the document shown in FIG. 49.

Figure 30:
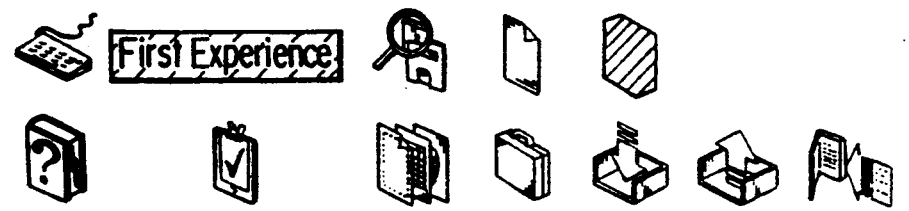
FIG. 30 shows a dragged text outline.

An object is moved by touching the stylus to it and holding the tip down. After a short delay (less than some predetermined minimum period of time, such as, preferably, a second), an animated "marquee" 740 will appear around the selection, as shown in FIG. 29. (This operation is represented by entries 627 and 628 shown in FIG. 45.) The selection can now be dragged to its new location, such as location 750 shown in FIG. 30.

Alternatively, the pen can be lifted after the marquee appears, which will cause the selection to "float" above the current page. Then the document can be scrolled, or one or more pages turned, and the selection can be dragged to its final destination. Tapping the selection or making another selection cancels the move.

Objects can also be moved different notebooks or onto or off of the bookshelf. The target of the move is the location of the stylus tip when it is lifted at the end of the drag.

Final location 760 shown in FIG. 31 depicts the result of the text move. The current selection can also be placed into "move" mode by selecting the "Move" entry 550 from the "Edit" menu 547, shown in FIG. 20.

The copying of an object is done in the same fashion as a move, except that the initial gesture is to tap on the object and then hold the tip down until the marquee 740 appears. The current selection can also be placed into "copy" mode by selecting the "Copy" entry 560 from the "Edit" menu 547. An object that is being copied is distinguishable by fact that the surrounding marquee is made up of a double row of dashes, vis-a-vis the single row of dashes which make up the marquee surrounding an object being moved.

In previous, mouse-based systems, an object is often moved by dragging it. That is, the cursor or pointing device is placed over a target, the button is pressed, and the button is held down while the cursor is moved to the new location desired for the object. In the present invention, the corresponding move may be considered a slow flick. By using the press-hold gesture 627 for a move, and the tap-press-hold gesture for a copy (see FIG. 45), the present invention can support the dragging function in all contexts, and can still distinguish gestures which are analogous to drags in more conventional systems.

Figure 32:
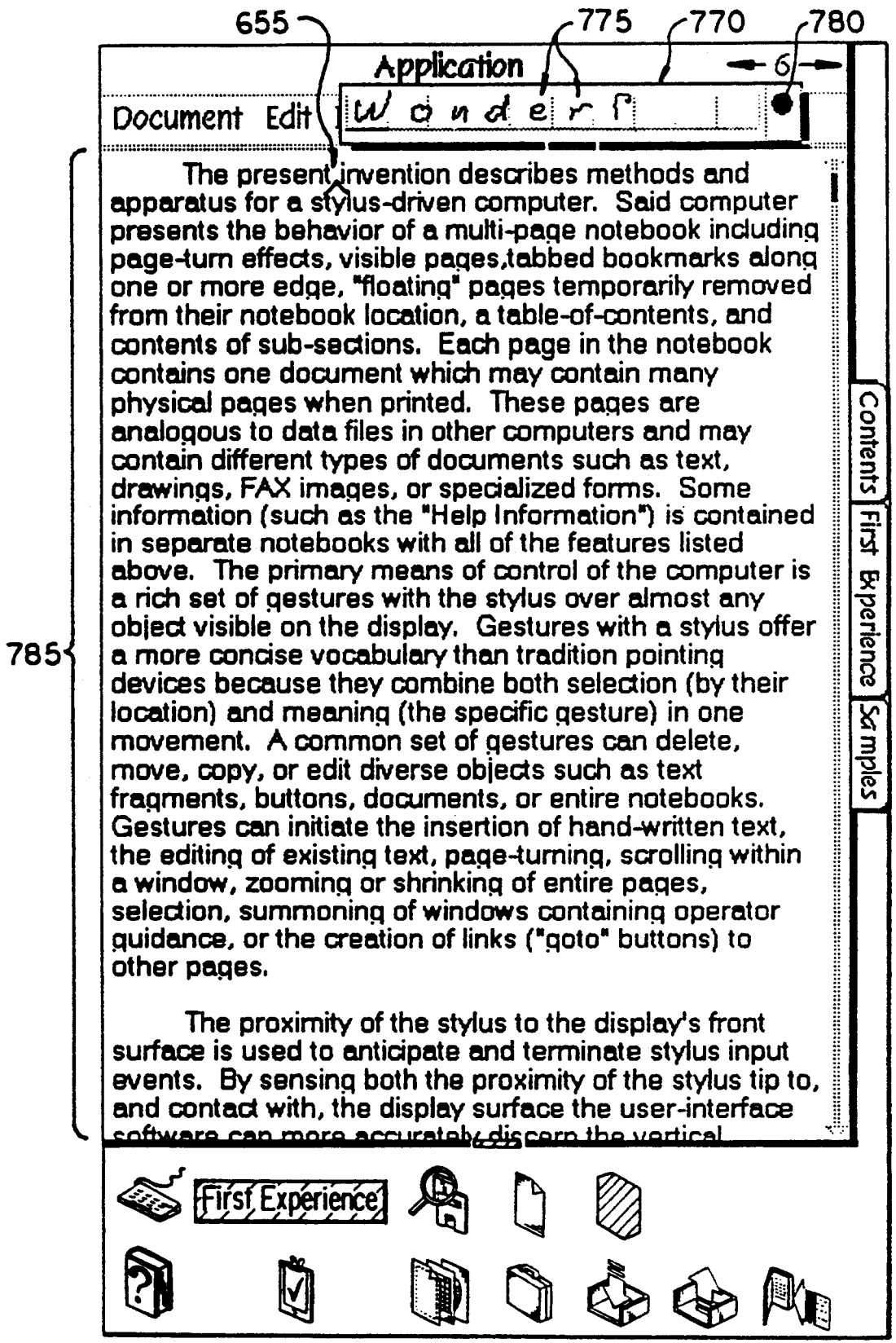
FIG. 32 shows handprinting in an edit pad.
Figure 33:
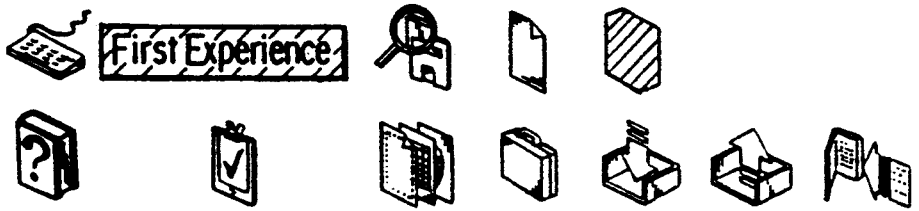
FIG. 33 shows the result of text edit.
Figure 35:
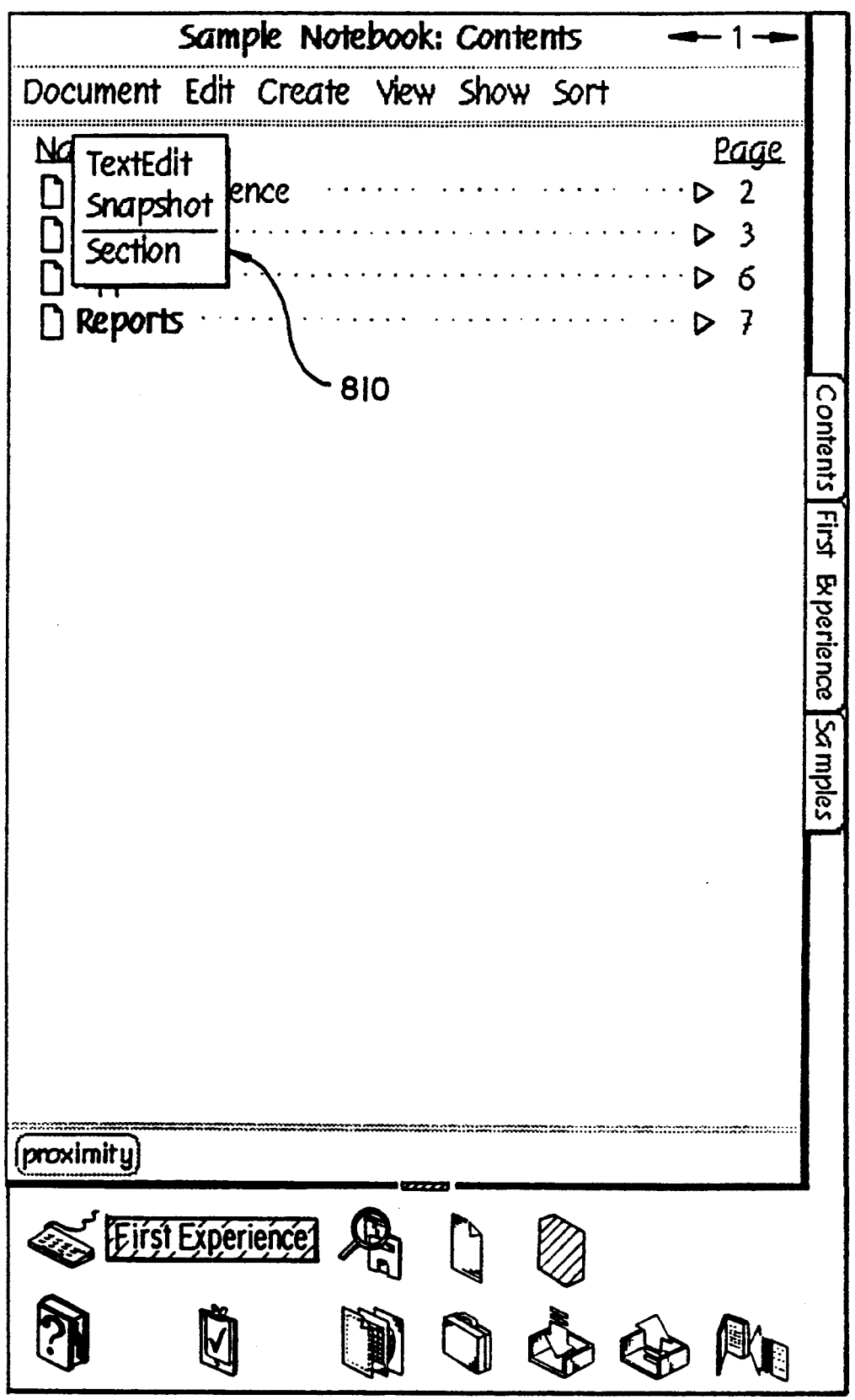
FIG. 35 shows a sample stationery palette.

The caret gesture 800 ("∧" shown in FIGS. 32 and 45) is used to insert new objects. Within a body of text, the caret gesture 800 causes a floating, empty input window or edit pad 770 to appear, as in FIG. 32. The text 775 to be added is handwritten into this edit pad 770, and is inserted into the main body 790 of the document 785 when the edit pad's close button 780 is pressed. The insertion point is at the hot-point of the caret 800, which is at its apex, and the result of the insertion procedure is shown in the top line of FIG. 33.

Figure 63:

FIGS. 63-65 illustrate the use of the caret gesture 800, which creates an edit pad 802 between at the hot point of the caret gesture 800, i.e. between the words "a" and "new". Thus, in FIG. 64, the user may write in by hand the word "quick", which is then converted to standard text type by the handwriting recognition software utilized in conjunction with the invention. When the button 804 of the edit pad 802 is tapped, the new word is inserted in the proper place in the text, as shown in FIG. 65.

In a section document, within a cork margin, or over the bookshelf, the caret gesture 800 invokes a list of stationery 810 from which the new document is chosen.

Figure 57:

New documents can also be added to a section by choosing a document type from the "Create" menu. Because a caret drawn in a text document creates an input pad, in order to avoid ambiguity another gesture must be used to create an embedded document. Thus, for this purpose a double-caret gesture 655 is used (see FIG. 45). This will lead to the same result that the single caret 800 does within a section document, namely a pop-up list of known stationery types. By way of example, in FIG. 56 the double-caret gesture 655 is used to call up the stationery pop-up list 655A, shown in FIG. 57. Then, the user may select on of the types of available stationery, such as the drawing paper, at which point the drawing paper icon 655B and title appear embedded in the document, as shown in FIG. 57A. To access and work with the drawing paper at this point, the user need only tap on the icon 655B.

Within the notebook 110, a question-mark gesture 820 (see FIGS. 36 and 45) is recognized over almost any displayed object. This gesture triggers the display of a floating notebook 830 containing a short summary of the characteristics of the targeted object and the gestures it responds to.

The user can easily create buttons linked to any selectable object in the computer. When such a button is tapped, the linked paged will be turned to. As with other buttons, a double-tap will float the linked page above the current page.

Link buttons are created by selecting the object to link to, and drawing the circle-tap gesture 659 shown in FIGS. 45 at the desired location of the button. The default label of a button 240 will be the name or contents of the target as appropriate, as shown in FIG. 4. This label can be edited using the circle gesture in the same fashion as any other user-definable text.

Figure 58:
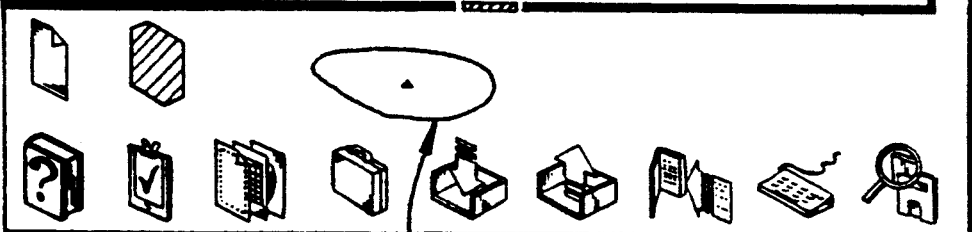
Figure 59:
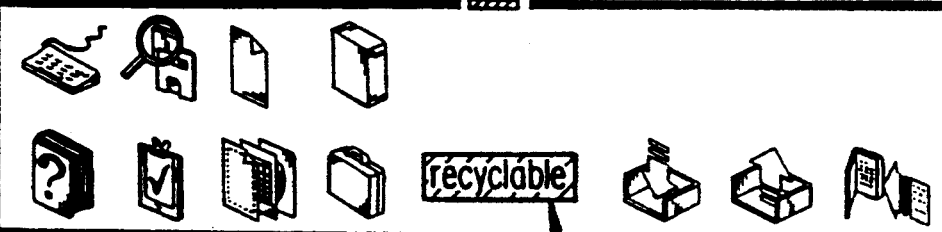

FIGS. 58-61 provide an illustration of the creation and deletion of use of a link button. In FIG. 58, the word "recyclable" has been highlighted, and the user has then drawn the circle-tap gesture 659 on the bookshelf 120. This creates a link button 659A, which is automatically labeled "recyclable".

Figure 60:
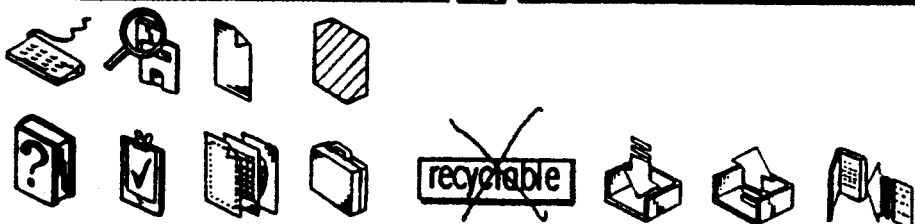

If the user desires, the link button 659A may also be deleted, by utilizing the x gesture 629, as shown in FIG. 60. The result, i.e. deletion of the link button 659A, is shown in FIG. 61.

Linked buttons can be placed on the bookshelf, in the cork margins of a document, or within the body of a document. They can be used to create a simple "hypertext" system or place bookmarks in the "Help" notebook.

Figure 62:
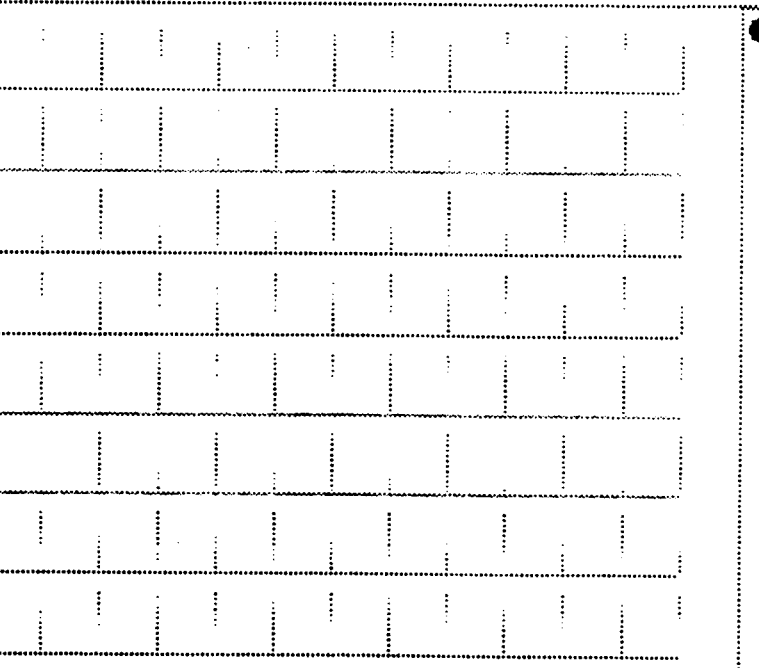

The caret-tap gesture 661, shown in FIGS. 45 and 61, is used to create an in-line insertion pad, i.e. a writing pad which is embedded into the document. Thus, use of the caret-tap gesture 661 in FIG. 61 results in the insertion pad 662 (shown in FIG. 62) appearing in the document, and it remains there until affirmatively removed by the user.

Many objects (such as icons) are activated or opened by tapping on them. Thus, a separate gesture is required to select such objects. For this purpose, the plus gesture 658, shown in FIG. 45, is used. The plus gesture 658 may be used either: (1) to select an object for a variety of purposes, such as selecting as a target of a goto button, or to delete it, or any other operation which may affect an icon; or (2) to add other objects to the current selection. For example, an icon on the bookshelf can be selected by drawing a plus 658 over it. (Selection of the icon is confirmed by the appearance of a box surrounding the icon.) In addition, the plus gesture may be used to select a number of non-adjacent documents in section document. Some applications for the present invention, such as drawing programs, support a drawn box to select the objects within the box. (This is like the square 657 shown in FIG. 45 and discussed above.)

The usefulness of the plus gesture 658 is also shown in FIGS. 69-72. For instance, the user may call up the Accessories sheet 664 shown in FIG. 70 by tapping on the briefcase icon 657A, which then becomes greyed to indicate that it has been accessed. The Personal Dictionary icon (or any other icon) is then selected by using the plus gesture 658, after which it is surrounded by a box as in FIG. 71. Then, for instance, the user may draw a circle-tap gesture 659 (as in FIG. 58) on the bookshelf 120, which creates an appropriately-named link button 665, as in FIG. 72. Thus, the plus gesture 658 serves as an accessing or selecting command.

Use of Proximity in a Notebook Computer

The sensing of the proximity of the stylus tip to the display surface of the computer is an important part of the gesture command termination for the gestures discussed above, and is accomplished in two different ways. Proximity before contact triggers indication on the display as to which objects are targeted, while movement out of proximity after contact with the display surface signals the completion of a series of stylus strokes. Thus, in each of the commands discussed above, the recognition and implementation of the computer commands begin immediately upon the departure from proximity of the stylus tip 6 from the screen 10.

An example of the use of proximity to anticipate object targeting is shown in FIG. 37 through FIG. 43. The document 835 supports the drawing of geometric figures such as lines, curves, rectangles, and ellipses. In the exemplary document 835, the objects have been used to lay out the floor plan of a hypothetical office.

An existing object 847 can be selected for manipulation by tapping on the desired object. The selection of such an object is indicated by the display of one or more small squares or "x's" 840 and 850 at the center and edges, respectively, of the object 847. These are used as "handles" (or "virtual handles") to move or resize the associated object. Which handle is targeted is indicated by its being enclosed by a small targeting square 860, shown in FIG. 38, as the stylus moves into proximity over that handle (here, handle 840).

Figure 39:
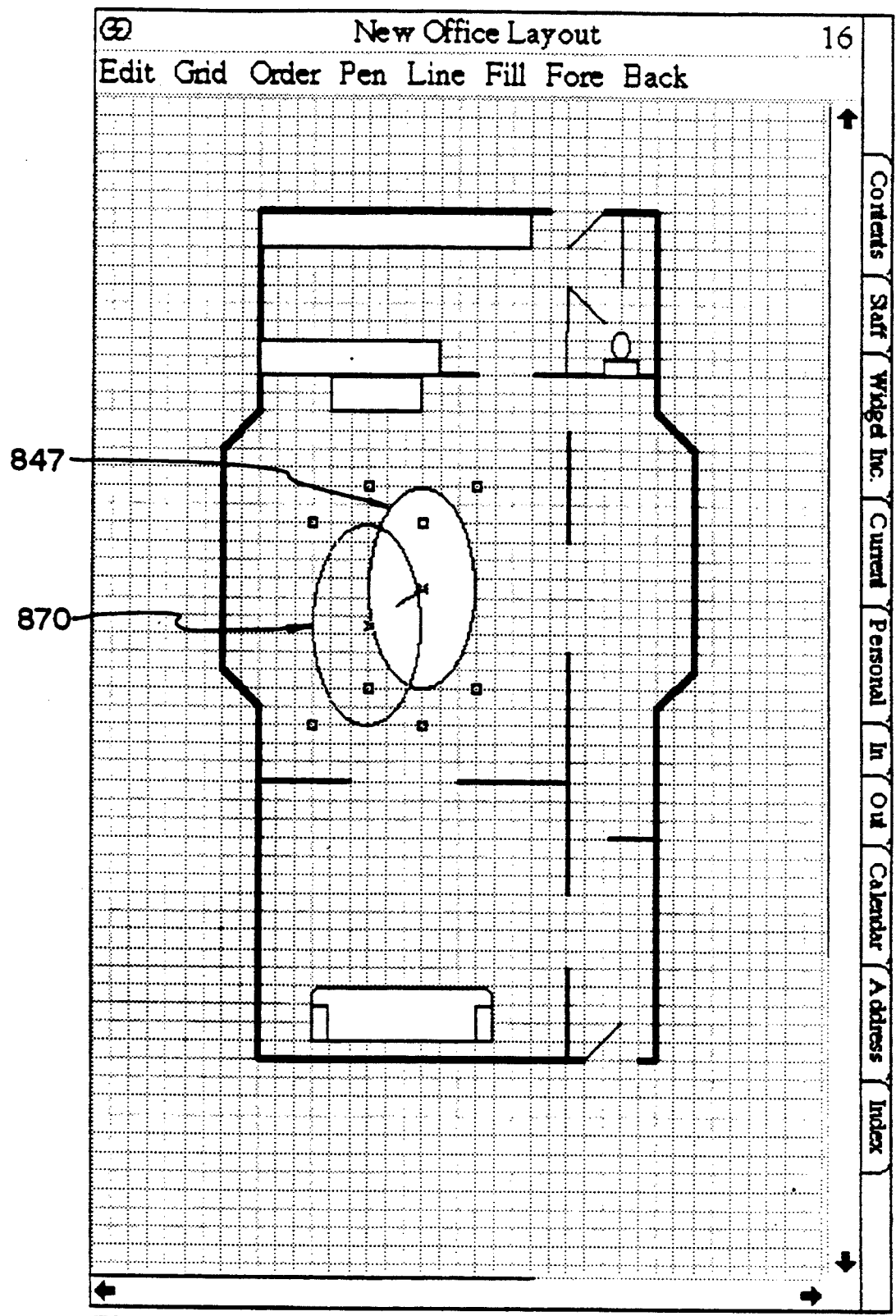
FIG. 39 shows an object being dragged.
Figure 40:
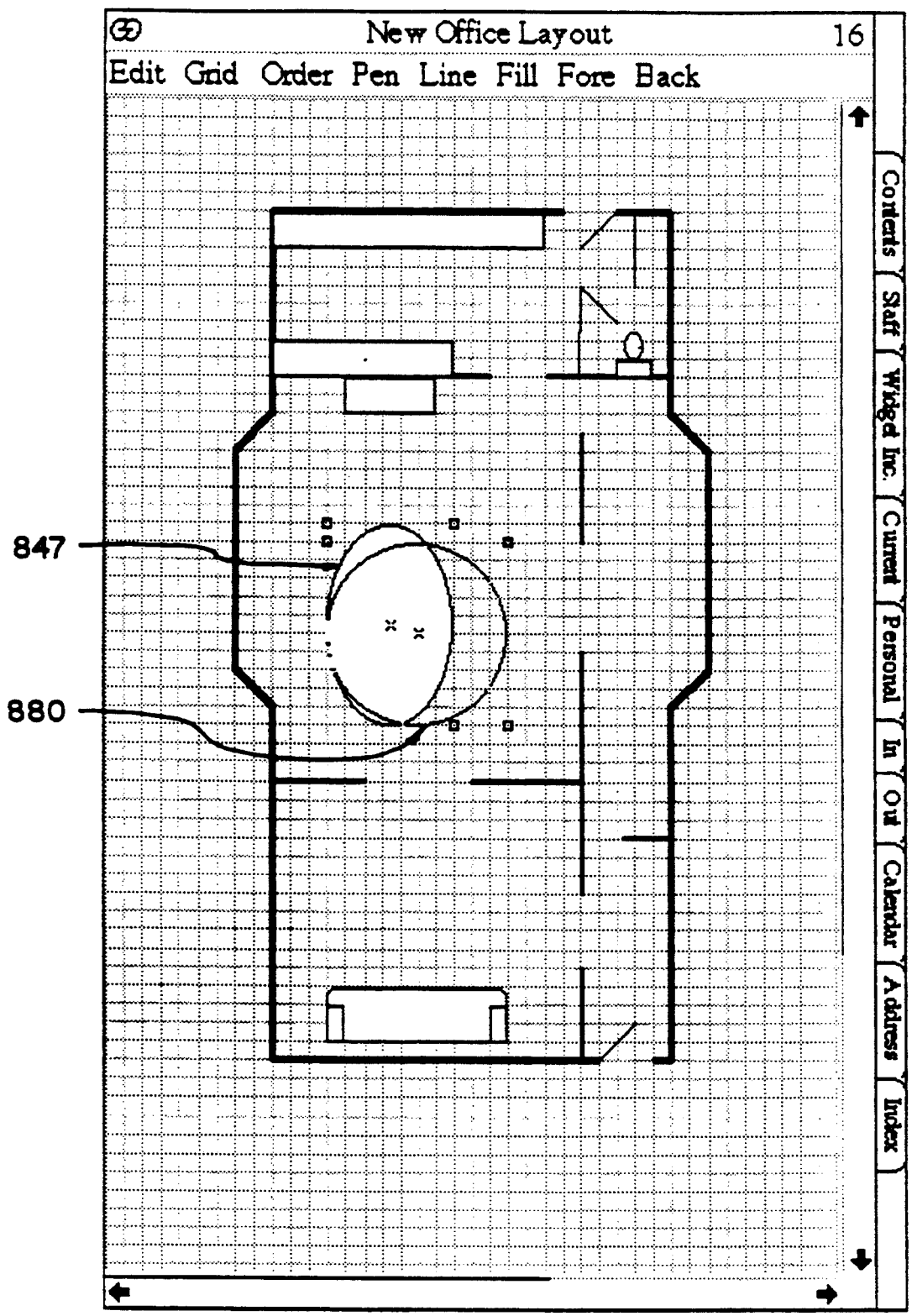
FIG. 40 shows an object being resized.

An object may be moved by touching the stylus tip to the x-shaped handle 840 at the object's center and dragging the stylus tip 6 to the desired new location 870, as shown in FIG. 39. Resizing is accomplished by touching and dragging one of the outlying box-shaped handles, resulting in resized object 880 shown in FIG. 40.

Figure 41:
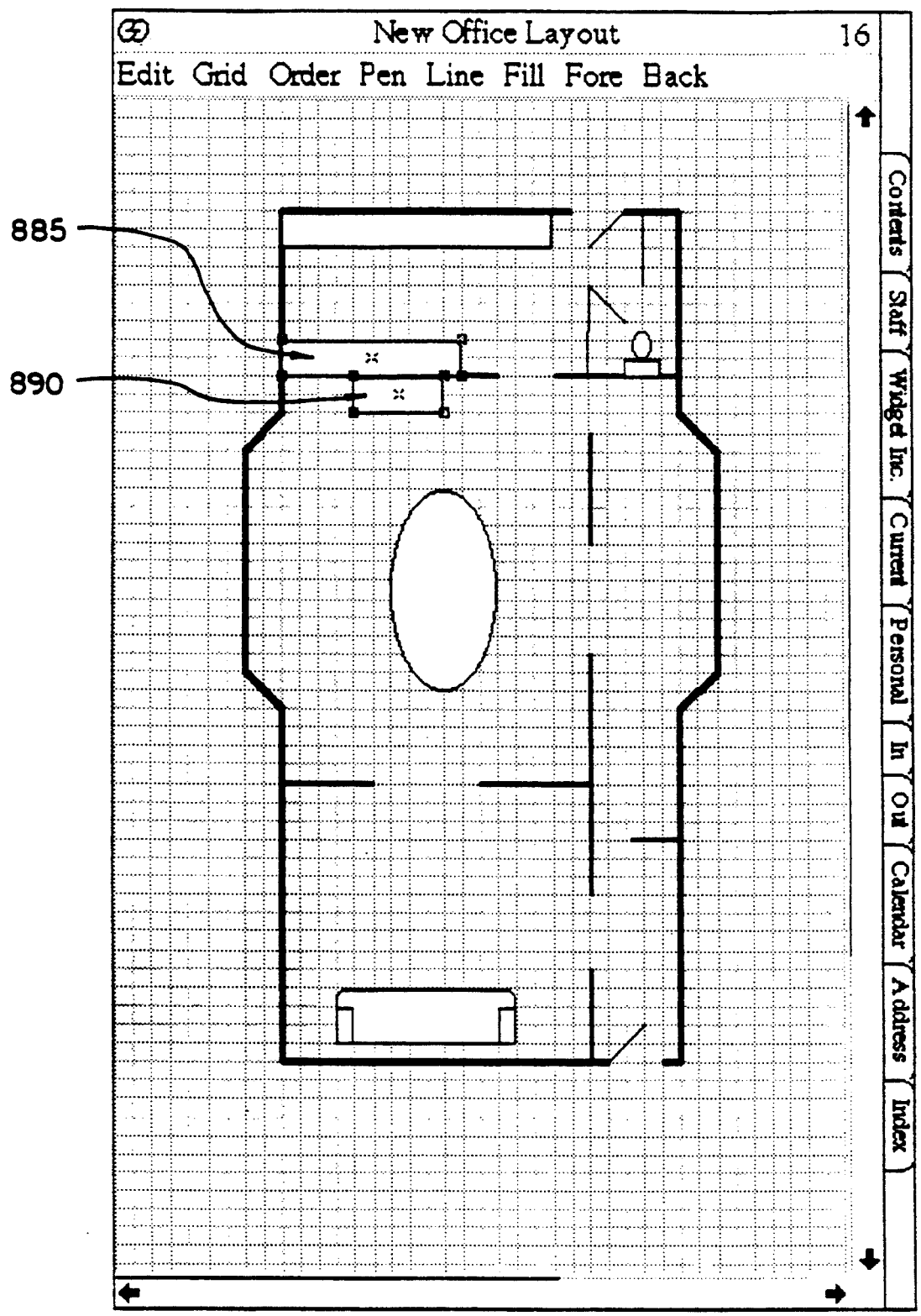
FIG. 41 shows two selected objects.
Figure 42:
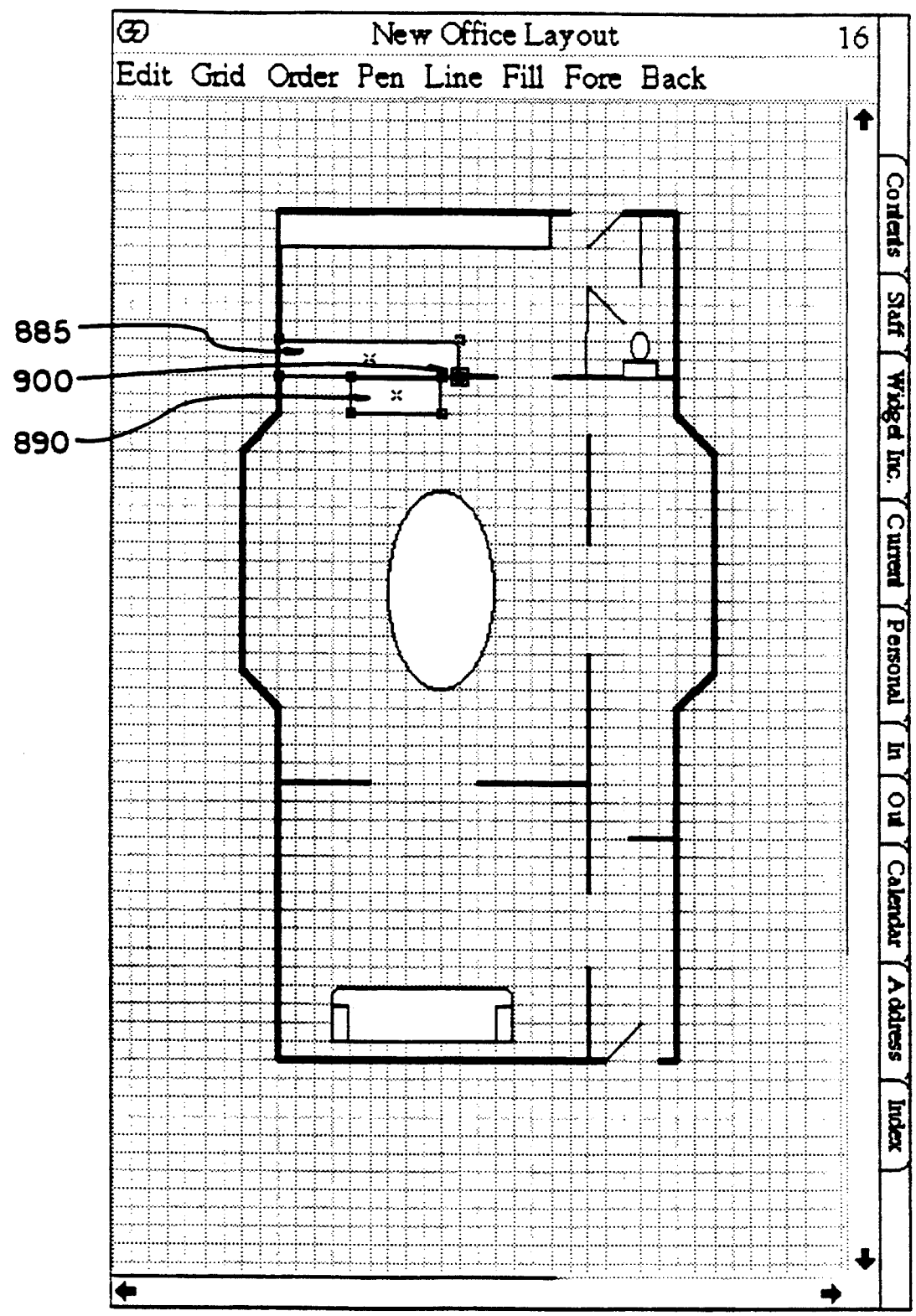
FIG. 42 shows a targeted handle on one of two closely-spaced objects.
Figure 43:
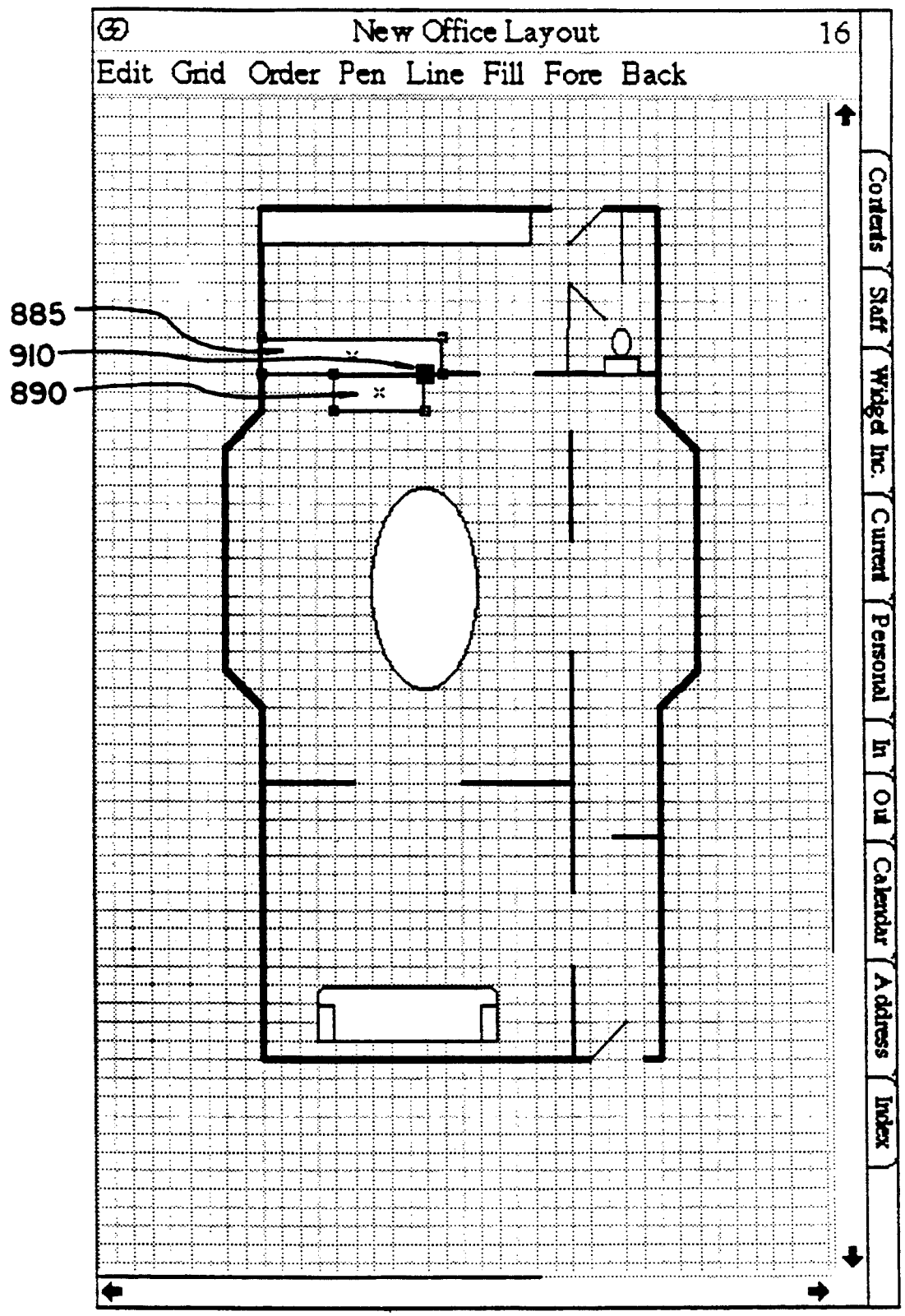
FIG. 43 shows a targeted handle on an adjacent object.

The previewing of the targeted handle is particularly useful when there are many handles close to one another, as shown in FIG. 41 with respect to objects 885 and 890. Because a hand-held stylus is a relatively coarse pointing device when compared to a display's resolution, accurate selection is enhanced by providing the highlighted-handle feedback to the user. FIG. 42 and FIG. 43 show the alternate targeting of two adjacent handles 900 and 910 of the objects 885 and 890, respectively.

An example of the use of the departure of the stylus from proximity to the display's surface is shown with respect to the computerized form shown in FIG. 44. Each of the underlined sections 920 supports the entry and recognition of handwriting. The recognition process is triggered by the user's natural movement of the stylus's tip from the vicinity of the display surface upon completion of one or more entries. As shown in FIG. 44, the user writes in one or more fields and lifts the stylus. This activates the matching process which culminates in the display of the recognized text. Any number of fields can be filled in, and in any order, before departing proximity.

From the foregoing, it will be understood that the used of proximity sensing in the notebook computer of the invention leads to a smoothly operating system where the user's actions are virtually as natural as if he or she were actually writing in a notebook. Other applications of this system may be found without departing from the spirit and scope of the invention.

We claim:

1. An apparatus for controlling a computer system, the computer system comprising a screen for displaying information and a stylus having a tip for inputting information into the computer, including:
   first detecting means coupled to said computer for detecting a stroke of the stylus tip in contact with the screen;
   second detecting means coupled to said computer for detecting a departure of the stylus tip from the screen;
   means coupled to said computer for defining termination of a gesture comprising at least one stroke in response to said departure of the stylus tip;
   means coupled to said computer for recognizing a plurality of said gestures, said recognizing means including means for comparing each said gesture to at least one predefined shape;
   means coupled to said computer for implementing each said recognized gesture, said implementing means including means for performing a predetermined action associated with each said predefined shape, said predetermined action being determined by the context in which said gesture was used, including a first context in which said action is executed upon an operating system level object and a second context in which said action is executed upon an application level object.

2. The apparatus of claim 1, wherein said gesture comprises a plurality of strokes.

3. The apparatus of claim 1, wherein:
   said second detecting means includes means for detecting proximity of the stylus tip to the screen; and
   said apparatus further includes means coupled to said computer for displaying an indicator of the proximity of the stylus tip to the screen.

4. The apparatus of claim 1, further including third detecting means for detecting a direction of motion of said gesture.

5. The apparatus of claim 1, further including means coupled to said computer for displaying on said screen a predefined shape representing the recognized gesture.

6. The apparatus of claim 1, further including means coupled to said computer for displaying on said screen a shape representing the actual gesture made by a user of the computer.

7. The apparatus of claim 1, wherein said gesture implementation includes input of said recognized gesture as data to be processed by said computer system.

8. The apparatus of claim 7, wherein said recognized gesture comprises a character.

9. The apparatus of claim 7, wherein said recognized gesture comprises a graphics object.

10. The apparatus of claim 1, wherein said implementing means includes means for implementing said second command for performing an operation which is common across a plurality of applications.

11. The apparatus of claim 2, wherein the plurality of strokes are separated by departure of the stylus tip from contact with the screen while the stylus tip is still proximate to the screen.

12. The apparatus of claim 3, further including means for terminating display of said indicator when the stylus tip departs from proximity to the screen.

13. The apparatus of claim 3, wherein said indicator comprises a virtual handle for manipulating an object displayed on the screen.

14. The apparatus of claim 3, wherein said indicator comprises highlighting of information displayed on the screen in proximity to said stylus tip.

15. The apparatus of claim 3, wherein said indicator indicates proximity of said stylus tip to an object displayed on the screen.

16. The apparatus of claim 15, wherein said object comprises at least one character.

17. The apparatus of claim 15, wherein said object comprises at least one graphics object.

18. The apparatus of claim 1, wherein said predetermined action is performed on a target object, said target object being determined by at least one attribute of said gestu.

19. The apparatus of claim 18, wherein said attribute comprises the location of the gesture on the screen.

20. The apparatus of claim 19, wherein said location comprises the location on the screen of the hot point portion of said gesture.

21. The apparatus of claim 18, wherein said attribute comprises the size of the gesture on the screen.

22. The apparatus of claim 1, wherein said predetermined action is performed on a target object, said target object being determined by the context in which said gesture was used.

23. The apparatus of claim 22, wherein said context comprises the application in which said gesture was used.

24. The apparatus of claim 18, further including means coupled to said computer for displaying on said screen a predefined shape representing the recognized gesture.

25. The apparatus of claim 18, further including means coupled to said computer for displaying on said screen a shape representing the actual gesture made by a user of the computer.

26. The apparatus of claim 18, further including means coupled to said computer for displaying on said screen a symbol indicating that the gesture has not been recognized.

27. The apparatus of claim 18, further including means coupled to said computer for displaying on said screen a symbol indicating that the input gesture is not appropriate to the context in which it was used.

28. The apparatus of claim 1,
further including means coupled to said computer for displaying on said screen a predefined shape representing the recognized gesture.

29. The apparatus of claim 1,
further including means coupled to said computer for displaying on said screen a symbol indicating that the gesture has not been recognized.

30. The apparatus of claim 1, wherein said recognizing means is also for comparing each said gesture to at least one predefined shape, for recognizing a first gesture corresponding to a first said predefined shape and a second gesture corresponding to a second said predefined shape, the apparatus further including:
means coupled to said computer for displaying on said screen said predefined shapes;
wherein said first and second predefined shapes are substantially identical but differ in their orientation on the screen when displayed by said displaying means.

31. The apparatus of claim 30, wherein said differences in orientation comprise a rotation on the screen of said substantially identical shapes.

32. The apparatus of claim 30, wherein said differences in orientation comprise an inversion on the screen of said substantially identical shapes.

33. The apparatus of claim 1,
wherein said predetermined action is performed on a target substantially enclosed by its associated said gesture, and wherein said target is selected as a result of the performance of said predetermined action.

34. The apparatus of claim 33, wherein said target comprises a graphics object.

35. The apparatus of claim 33, wherein said target comprises at least one character.

36. The apparatus of claim 35, wherein said character is selected to be edited as a result of the performance of said predetermined action.

37. The apparatus of claim 35, wherein said at least one character is selected to be replaced by at least one other character to be inputted into said computer as a result of the performance of said predetermined action.

38. The apparatus of claim 33, wherein the predetermined shape of said recognized gesture comprises a circle.

39. An apparatus for controlling a computer system, the computer system comprising a screen for displaying information and a stylus having a tip for inputting information into the computer, including:
detecting means coupled to said computer for detecting a stroke of the stylus tip in contact with the screen;
means coupled to said computer for recognizing a gesture comprising at least one stroke and an event indicating termination of the gesture, said recognizing means including means for comparing said gesture to at least one predefined shape and being for recognizing at least a first gesture, a second gesture, and a third gesture comprising said first and second gestures; and
implementing means coupled to said computer for implementing each recognized gesture, said implementing means including means for performing a first predetermined action associated with said first gesture, a second predetermined action associated with said second gesture, and a third predetermined action associated with said third gesture.

40. The apparatus of claim 39, wherein the shapes of said first and second gestures are substantially identical.

41. An apparatus for controlling a computer system, the computer system comprising a screen for displaying information and a stylus having a tip for inputting information into the computer, including:
first detecting means coupled to said computer for detecting a stroke of the stylus tip in contact with the screen;
means coupled to said computer for recognizing a gesture comprising at least one stroke and an event indicating termination of the gesture, said recognizing means including means for comparing said gesture to at least one predefined shape, each stroke of said gesture being located in substantially the same area of the screen:
second detecting means for detecting a direction of motion of the creation of said gesture, wherein the predefined shape of said recognized gesture also represents said direction of motion; and
implementing means coupled to said computer for implementing said recognized gesture, said implementing means including means for performing a predetermined action associated with said predefined shape.

42. The apparatus of claim 41, further including means coupled to said computer for displaying on said screen a predefined shape representing the recognized gesture.

43. The apparatus of claim 41, further including means coupled to said computer for displaying on said screen a shape representing the actual gesture made by a user of the computer.

44. The apparatus of claim 41, further including means coupled to said computer for displaying on said screen a symbol indicating that the gesture has not been recognized.

45. The apparatus of claim 41, further including means coupled to said computer for displaying on said screen a symbol indicating that the input gesture is not appropriate to the context in which it was used.

46. The apparatus of claim 41, wherein said direction of motion of said gesture is associated with said predetermined action.

* * * * *